(12) United States Patent
Winig et al.

(10) Patent No.: US 6,935,518 B2
(45) Date of Patent: Aug. 30, 2005

(54) SYSTEM AND APPARATUS FOR HOLDING AN ITEM IN STORAGE

(75) Inventors: Alan Winig, Wynnewood, PA (US); Richard Winig, Villanova, PA (US); James Eldon, Barto, PA (US)

(73) Assignee: SS3 Storage Systems, L.L.C., Wilmington, DE (US)

( * ) Notice: Subject to any disclaimer, the term of this patent is extended or adjusted under 35 U.S.C. 154(b) by 0 days.

(21) Appl. No.: 10/445,699

(22) Filed: May 27, 2003

(65) Prior Publication Data

US 2003/0192843 A1 Oct. 16, 2003

Related U.S. Application Data

(63) Continuation-in-part of application No. 10/054,835, filed on Jan. 23, 2002, now Pat. No. 6,581,788.

(51) Int. Cl.⁷ .............................. A47F 5/08; A47F 5/00
(52) U.S. Cl. ............................. 211/90.02; 211/106.01; 211/87.01; 248/220.31
(58) Field of Search ........................ 211/90.02, 106.01, 211/87.01, 86.01, 183, 94.01, 57.1, 59.1, 90.01; 248/220.31, 222.11, 221.11, 222.13, 224.7, 225.21, 304; 411/508

(56) References Cited

U.S. PATENT DOCUMENTS

| | | | |
|---|---|---|---|
| 1,958,772 A | 5/1934 | Stewart | |
| 1,992,857 A | 2/1935 | Breedlove | |
| 2,121,307 A | 6/1938 | Swift | |
| 2,154,046 A | * 4/1939 | Kost | 248/73 |
| 2,618,033 A | * 11/1952 | Tinnerman et al. | 248/68.1 |
| 2,785,919 A | 3/1957 | Grondzik | |
| 2,887,802 A | 5/1959 | Burmeister | |
| 2,956,687 A | 10/1960 | Robichaud | |
| 2,995,256 A | 8/1961 | Schoenfisch | |
| 3,012,745 A | * 12/1961 | Donovan | 248/71 |
| 3,063,569 A | 11/1962 | Huber | |
| 3,066,367 A | * 12/1962 | Garman | 248/222.11 |
| 3,565,020 A | 2/1971 | Schier | |
| 3,954,243 A | * 5/1976 | Sharp et al. | 248/235 |
| 3,970,276 A | * 7/1976 | Debaigt | 248/221.11 |
| 4,103,854 A | * 8/1978 | Pliml et al. | 248/235 |
| 4,307,864 A | * 12/1981 | Benoit | 248/222.11 |
| 4,325,484 A | 4/1982 | Berry | |
| 4,340,144 A | 7/1982 | Cousins | |
| 4,407,476 A | 10/1983 | Bohannan | |
| 4,439,884 A | 4/1984 | Giorni | |
| 4,450,961 A | 5/1984 | Bies et al. | |
| 4,500,943 A | 2/1985 | Greene | |
| 4,506,856 A | * 3/1985 | Rich et al. | 248/220.31 |
| 4,508,301 A | 4/1985 | Nicholson et al. | |
| 4,516,681 A | 5/1985 | Jahel | |

(Continued)

*Primary Examiner*—Jennifer E. Novosad
(74) *Attorney, Agent, or Firm*—Duane Morris LLP

(57) ABSTRACT

An item holder for use with a perforated panel having a shank with a support arm extending outwardly from a first end and a catch located at a second end. The catch includes a curved cantilevered strap projecting from the second end and having a stop tab located at a strap end positioned above, but spaced away from the second end. A system for supporting an item on a vertically oriented structure including a planar board having spaced perforations, where each perforation is defined by an internal top edge and an internal bottom edge of the board. An item holder that engages the board with a slot defined through the underside of the cantilevered strap between a top portion of the shank and the second end of the cantilevered strap so that when the item holder is located within one of the plurality of perforations, the slot engages the internal bottom edge of the board.

6 Claims, 33 Drawing Sheets

U.S. PATENT DOCUMENTS

| | | | |
|---|---|---|---|
| 4,597,496 A | 7/1986 | Kaplan | |
| 4,619,428 A | 10/1986 | Bailey | |
| 4,632,256 A | 12/1986 | Gambello | |
| 4,720,069 A | 1/1988 | Bessinger | |
| 4,771,897 A | 9/1988 | Ho | |
| 4,826,022 A * | 5/1989 | Duarte | 211/59.1 |
| 4,905,951 A | 3/1990 | Putness | |
| 4,936,565 A | 6/1990 | Fredrickson | |
| 5,005,710 A | 4/1991 | Hofer | |
| 5,154,304 A * | 10/1992 | McAuley | 211/59.1 |
| 5,201,430 A | 4/1993 | Artzer | |
| 5,224,609 A | 7/1993 | Bauer et al. | |
| 5,337,987 A | 8/1994 | Sawatsky | |
| 5,482,168 A | 1/1996 | Welch et al. | |
| 5,503,277 A * | 4/1996 | O'Brien | 211/106.01 |
| 5,515,969 A | 5/1996 | Schonenbach | |
| 5,531,416 A | 7/1996 | Remmers | |
| 5,573,111 A | 11/1996 | Gordon et al. | |
| 5,597,280 A * | 1/1997 | Stern | 411/508 |
| 5,690,684 A | 11/1997 | Andrews et al. | |
| 5,706,936 A | 1/1998 | Bernstein | |
| 5,711,419 A | 1/1998 | Beales et al. | |
| 5,711,435 A | 1/1998 | Morison et al. | |
| 5,738,228 A | 4/1998 | Bittinger | |
| 5,855,274 A | 1/1999 | Piao | |
| 5,909,936 A | 6/1999 | Daniels et al. | |
| 5,915,307 A | 6/1999 | Tisbo et al. | |
| 5,915,572 A | 6/1999 | Hancock | |
| 5,970,663 A | 10/1999 | McDonough | |
| 6,000,912 A | 12/1999 | Takada et al. | |
| 6,019,331 A | 2/2000 | Hoogland et al. | |
| 6,050,426 A | 4/2000 | Leurdijk | |
| 6,070,747 A | 6/2000 | Shea | |
| 6,234,436 B1 * | 5/2001 | Kump | 248/220.21 |
| 6,250,466 B1 | 6/2001 | Ernst | |
| 6,257,425 B1 | 7/2001 | Liu | |
| 6,273,255 B1 | 8/2001 | Rosler | |
| 6,273,277 B1 | 8/2001 | Geldenhuys | |
| 6,299,001 B1 | 10/2001 | Frolov et al. | |
| 6,309,085 B1 * | 10/2001 | Katz et al. | 362/234 |
| 6,450,338 B1 | 9/2002 | Chen | |
| 6,481,583 B1 | 11/2002 | Black et al. | |
| 6,491,267 B1 | 12/2002 | Feldman | |
| 6,695,269 B1 * | 2/2004 | Anscher | 248/225.11 |

* cited by examiner

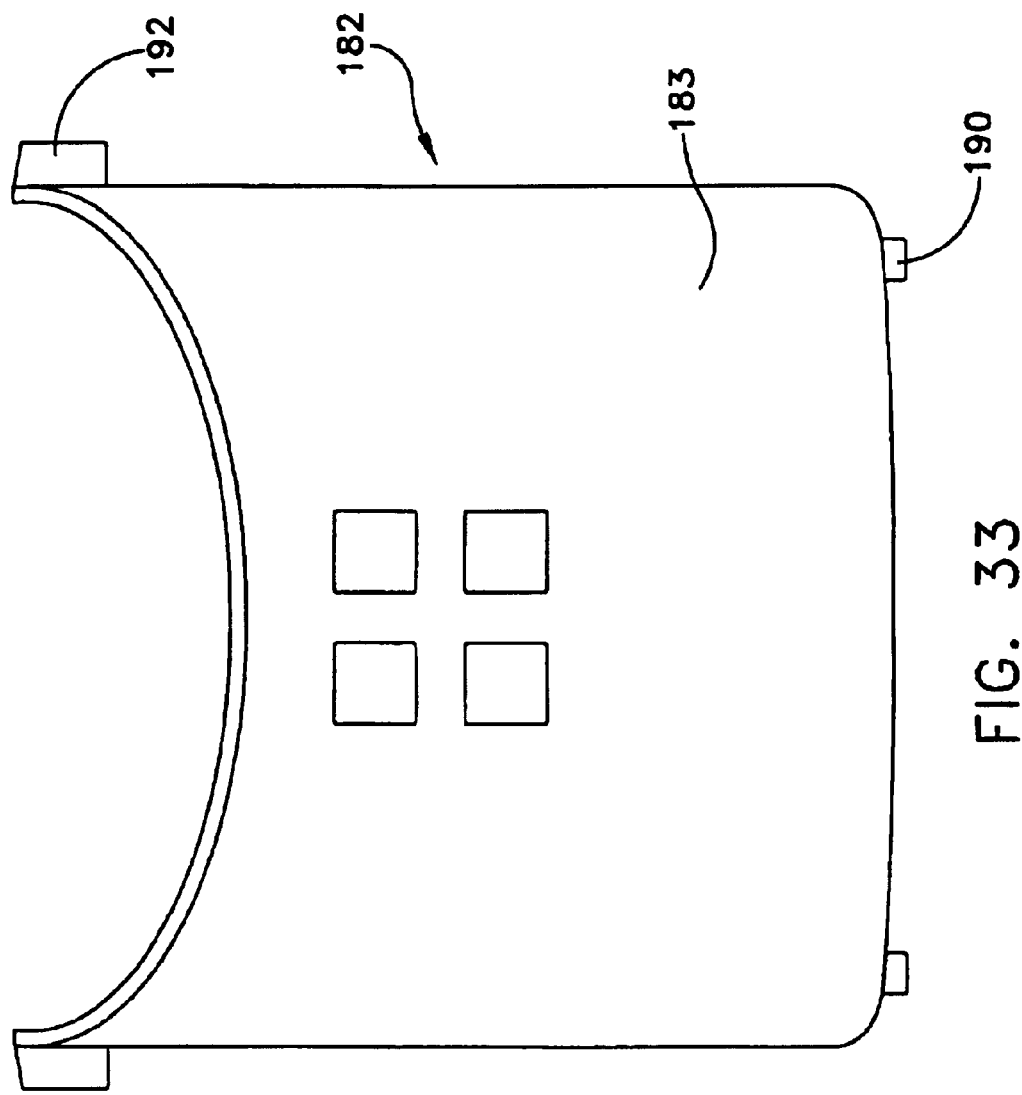

SYSTEM AND APPARATUS FOR HOLDING AN ITEM IN STORAGE

CROSS-REFERENCE TO RELATED APPLICATIONS

This application is a continuation-in-part application of U.S. application Ser. No. 10/054,835, filed on Jan. 23, 2002, now U.S. Pat. No. 6,581,788.

FIELD OF THE INVENTION

The present invention relates to storage and organizational systems and devices, and more particularly to storage and organizational systems and devices for storing home and garden tools or the like.

BACKGROUND OF THE INVENTION

In modern American suburbia, the garage has become the storage receptacle for a myriad of items that are necessary for work and recreation. The need for this storage space has become so acute that many suburban dwellings contain a 3-car garage even though the occupants own only two vehicles. Although, in many instances a recreational vehicle or boat occupies the third bay; in most cases, that extra space is utilized for storage and as a work area. Items such as sports equipment, gardening implements, and work shop related items, e.g., screwdrivers, hammers, wrenches, hand and power tools, and other implements for home, vehicle, or garden repair and maintenance are generally stored in the garage.

There are a number of systems for storing relatively small and lightweight articles known in the art. For example, pegboard or perforated panel systems are known for hanging articles in a vertical or horizontal orientation using pegboard hooks that are removably attached to a perforated panel. Shelving may also be provided on pegboards using the same or similar structures for securing and supporting the shelf to the pegboard. Prior art perforated panel systems (known as "pegboards") typically comprise a pressed composite board material with regularly spaced circular perforations into which hooks may be inserted for the storage or display of tools, instruments, and other articles. Changing the locations of the stored articles requires that the hooks or shelf-supports be removed completely from their respective supporting holes in the pegboard, and then reinserted into other holes. After a period of use, the holes tend to become worn and enlarged, and eventually become unable to retain the hooks. Also, the hooks are easily misplaced or lost. These pegboard systems are also aesthetically unattractive, especially after many years of use.

A wide variety of useful fasteners for holding items to walls are also well known in the art. When attaching items to a perforated wall or pegboard, however, the available fasteners are much fewer in number, and those that are available have many severe drawbacks. Those who use pegboards are also familiar with the frustration and irritation associated with an insecure hook. Such fasteners often pull off the pegboard and get lost or damaged, especially when only one or two items are held. The typical pegboard fastener is a straight single or double bar, usually extending from about two inches to about six inches from the pegboard. A pegboard fastener of this type usually has a pair of bent rod-like offset hooked portions at its top. These offset hooked portions are inserted into horizontally adjacent holes, by a pivoting action, to situate the top tip of the hooked portions behind the wallboard while allowing the lower part of the fastener to rest against the front surface of the wallboard.

While the use of a pair of hooked portions may inhibit rotation of the pegboard fastener, it does not avoid the frustration experienced when the pegboard fastener itself is pulled off the pegboard along with the item being removed. Those who encounter such fasteners or holders for hanging items experience frustration and irritation when attempting to remove the item from the fastener, since the bottom portion of the fastener is easily pulled away from the wall surface, i.e., there is no provision for fixing it to the pegboard.

Therefore, it would be advantageous to have a storage system which allowed ease of accessibility to tools, such as gardening implements, while maximizing the use of garage space, in an aesthetically satisfying manner. It would also be advantageous to have a storage system that could be mounted directly to the walls of a typical garage or tool shed, thereby allowing effective use of available space while removing sports equipment, gardening implements, and work shop related items from the floor space of the garage or a tool shed.

SUMMARY OF THE INVENTION

In one embodiment of the invention, an item holder for use with a perforated panel is provided comprising a shank having a support arm extending outwardly from a first end and a catch located at a second end. The catch comprises a curved cantilevered strap projecting from the second end and having a stop tab located at a strap end positioned above, but spaced away from the second end.

In another embodiment, a system for supporting an item on a vertically oriented structure is provided including a substantially planar board having a front surface, a rear surface, and a plurality of spaced perforations, where each perforation is defined by at least an internal top edge and an internal bottom edge of the board. An item holder is provided that comprises a shank having a support arm extending outwardly from a first end and a catch located at a second end. The catch comprises a curved cantilevered strap projecting from the second end and having a stop tab located at a strap end positioned above, but spaced away from the second end. A slot is defined through the underside of the cantilevered strap between a top portion of the shank and the second end of the cantilevered strap so that when the item holder is located within one of the plurality of perforations, the slot engages the internal bottom edge of the board.

In a further embodiment of the invention, a tool holder is provided that includes at least one disk-shaped flexible member having an aperture. The flexible member comprises a plurality of fingers capable of resiliently deflecting to grip a portion of the tool when axially inserted therethrough in one direction so that the tool is held in an upright position by the flexible member.

BRIEF DESCRIPTION OF THE DRAWINGS

These and other features and advantages of the present invention will be more fully disclosed in, or rendered obvious by, the following detailed description of the preferred embodiments of the invention, which are to be considered together with the accompanying drawings wherein like numbers refer to like parts and further wherein:

FIG. 32 and FIG. 33 are an item support and item receptacle, respectively, both formed so as to be mounted to the face of a perforated panel, as shown in FIGS. 1–4.

DETAILED DESCRIPTION OF THE PREFERRED EMBODIMENT

Figure 1:
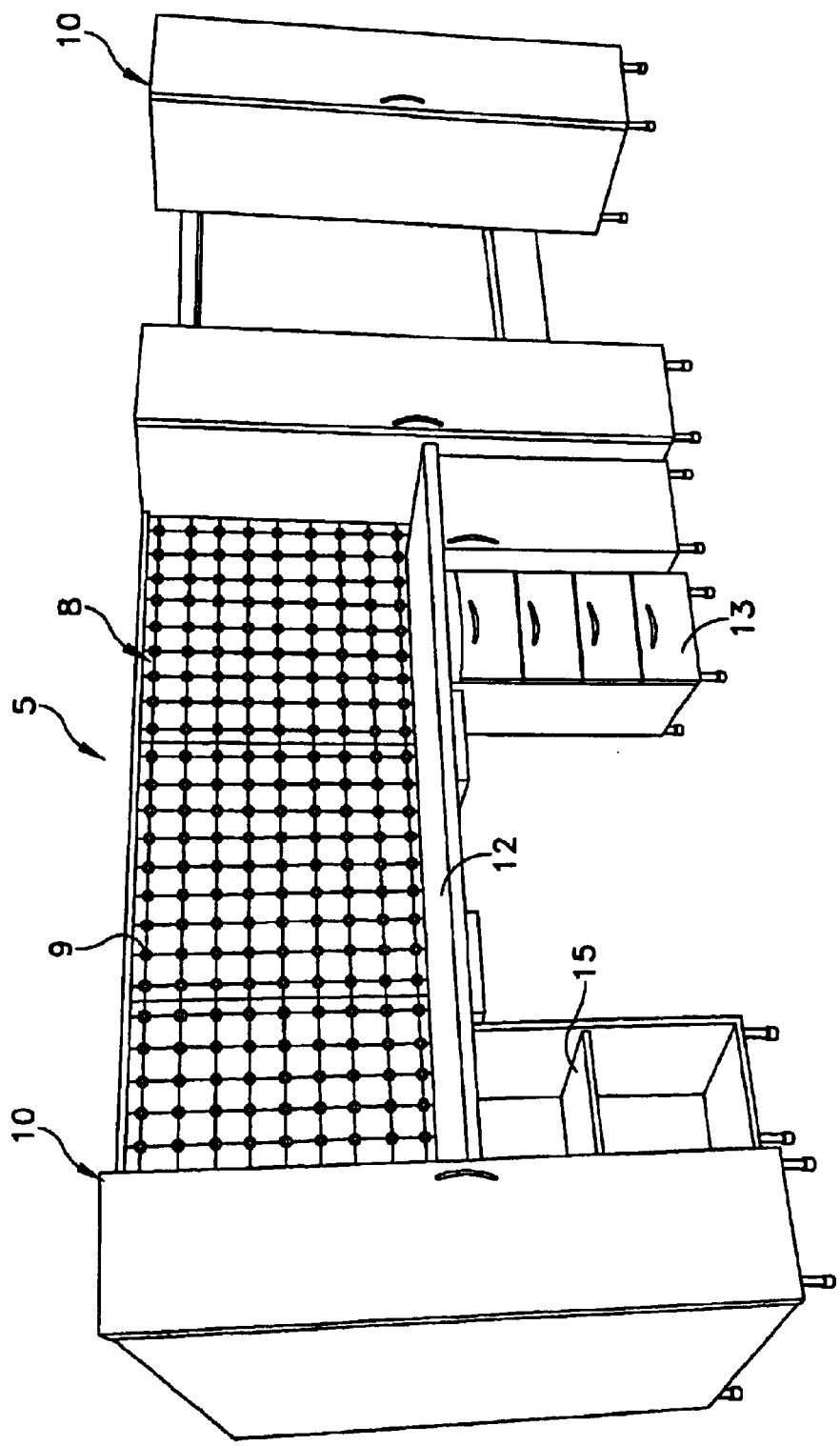
FIG. 1 is a perspective view of a storage system formed in accordance with the present invention.

This description of preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. In the claims, means-plus-function clauses are intended to cover the structures described, suggested, or rendered obvious by the written description or drawings for performing the recited function, including not only structural equivalents but also equivalent structures.

Figure 2:
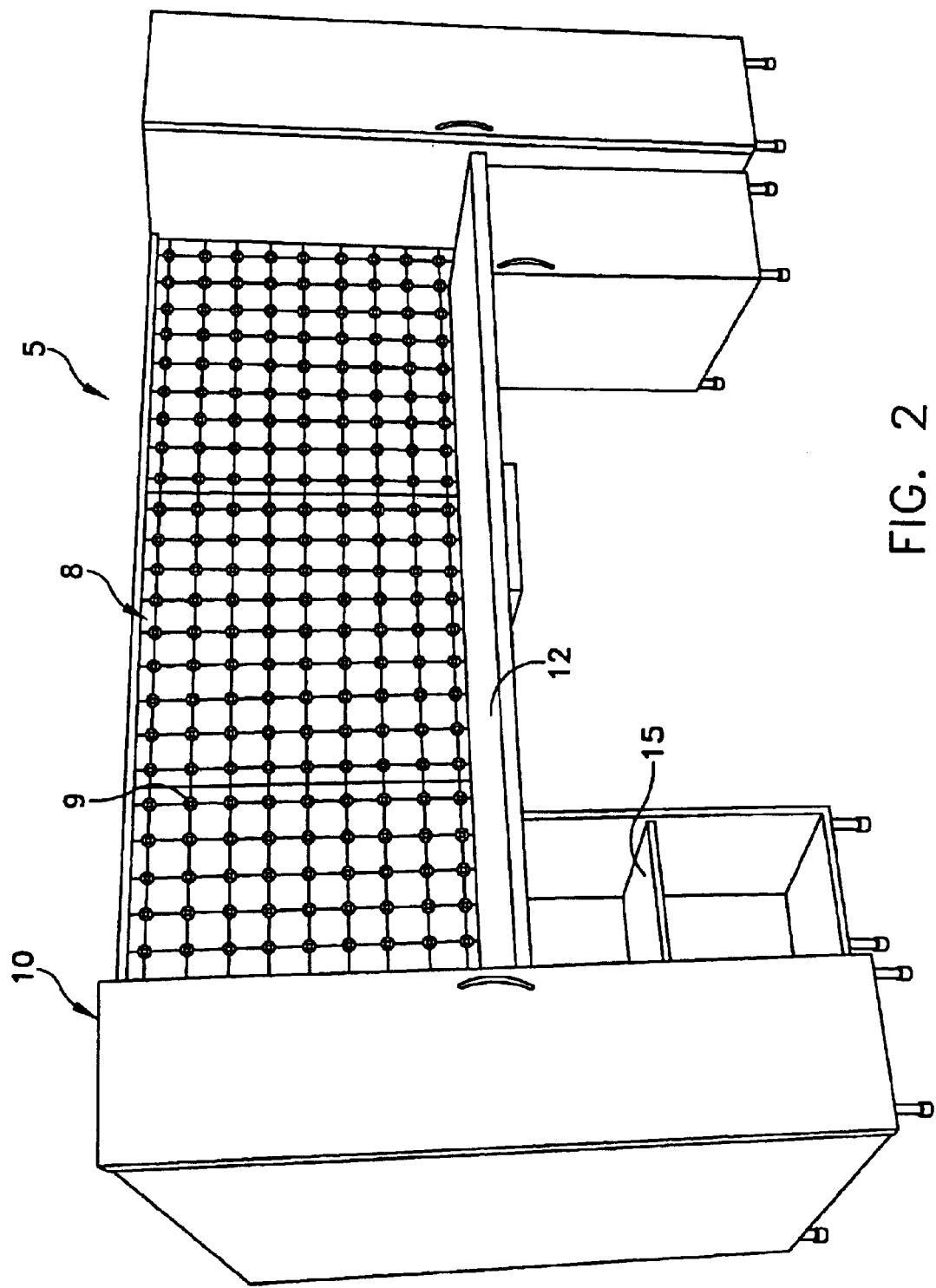
FIG. 2 is a further embodiment of the storage system shown in FIG. 1.
Figure 3:
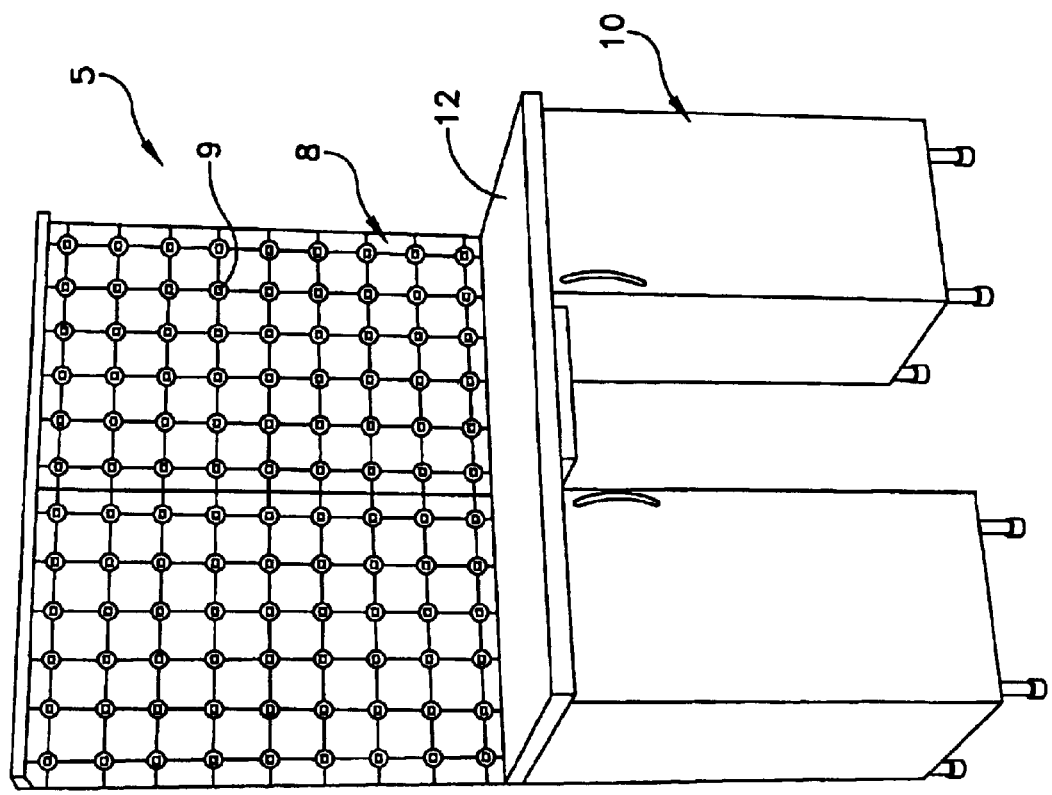
FIG. 3 is another variation of the storage system shown in FIGS. 1 and 2.

Referring to FIGS. 1–3, a new and improved storage and organization system 5 is provided comprising a perforated panel 8, storage cabinets 10, bench 12, drawers 13, and shelves 15. Storage system 5 is modular in construction such that various combinations of shelves, drawers, and cabinets may be arranged as needed or dictated by its position within a building, e.g., a residential garage, tool shed, or basement area. Storage cabinets 10, bench 12, drawers 13, and shelves 15 are typically formed of common furniture construction materials, e.g., various metals, woods, or polymers. Perforated panel 8 comprises a planer sheet of material, preferably formed of a polymer or metal, and having a plurality of regularly shaped perforations 9, disposed in a regular pattern throughout the panel. Perforations 9 are each preferably formed in perforated panel 8 so as to be defined by a circumferential edge, often forming a rectangular or square opening in panel 8. Perforated panel 8 is typically about one quarter to one half of an inch thick, and in modules about two to three feet wide. Of course, it will be understood that perforated panel 8 may have various lengths and widths, depending upon the size of storage system 5. Fixtures (not shown) for providing electric, gas, or pneumatic outlets may also be positioned anywhere within storage system 5, as well as appliances, e.g., refrigerators or the like.

Referring to FIGS. 1–4, perforated panel 8 is arranged above bench 12 so that a plurality of item holders 20 may be positioned on the front surface of perforated panel 8. For convenience in this specification, the term "item holder" will be used to represent a type of fixture that is attachable to perforated panel 8 by insertion of an element into at least one of perforations 9 and used to hold various implements, i.e., hand tools, garden tools, instruments, wires, cables, display objects (such as packages, blister display packs, vacuum display packs, loose hardware or household items, grocery items, department or variety store items, and shelves, pictures, wire frames, and the like. In one preferred embodiment, item holder 20 comprises a shelf 26 held to perforated panel 8, via shelf-brackets 30.

Figure 5:
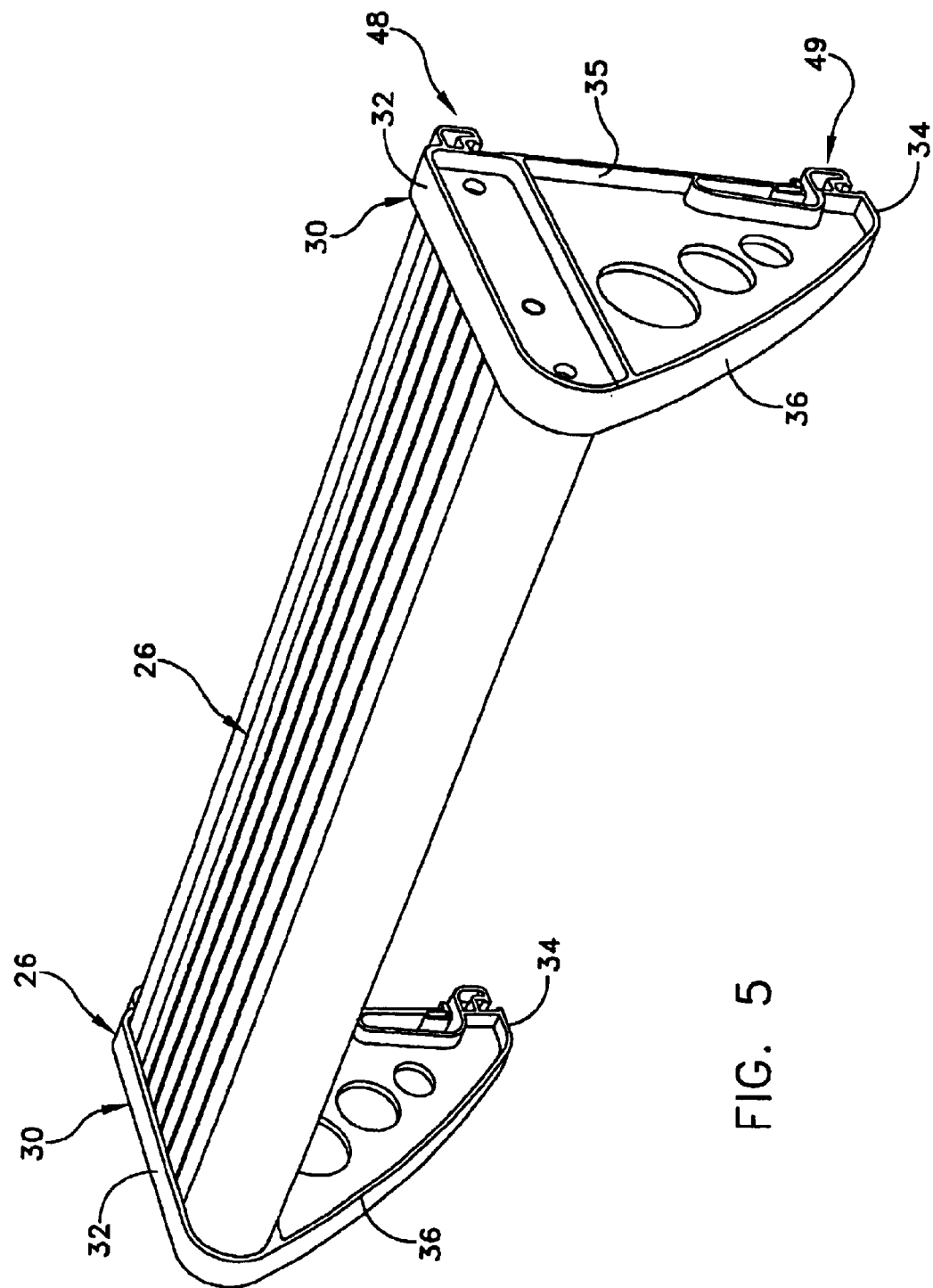
FIG. 5 is a perspective view of a novel item holder formed in accordance with the present invention.
Figure 6:
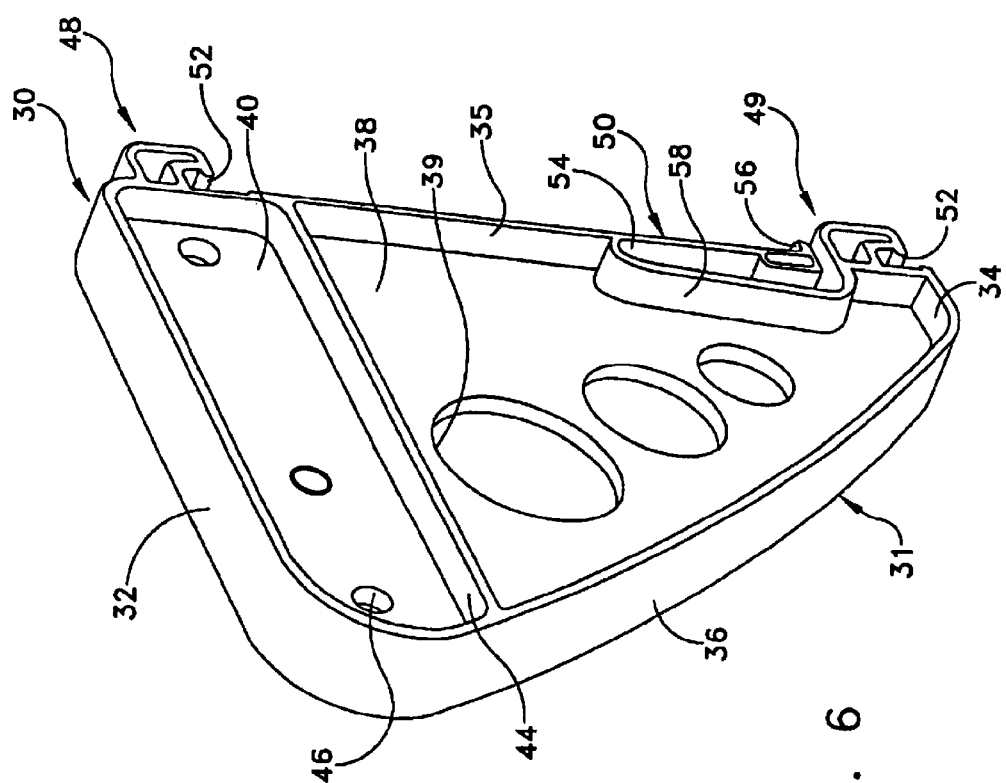
FIG. 6 is a perspective view of a shelf-bracket system formed in accordance with the present invention.

Referring to FIGS. 5 and 6, shelf-brackets 30 comprise a circumferential flange 31 having a top surface 32, an outward face 36, a bottom 34, and an inner wall 35. A lower web 38 is positioned between outward face 36, bottom 34, and inner wall 35. Shelf-brackets 30 are preferably formed from an injection moldable polymer, but may also be formed from metal or other materials as desired. A plurality of openings 39 are defined through lower web 38, often having varying diameters. An upper web 40 is positioned between top surface 32 and lower web 38. A ledge 44 projects outwardly in circumferential surrounding relation to upper web 40, thereby separating upper web 40 from lower web 38 and forming a receptacle portion for receiving an end edge of shelf 26. A plurality of holes 46 are defined through upper web 40. An upper panel-catch 48 and a lower panel-catch 49 project outwardly from the outer surface of inner wall 35. Each of upper panel-catch 48 and lower panel-catch 49 comprise a substantially "hook" shape having a lock-tab 52 projecting toward the outer surface of inner wall 35.

Adjacent to lower panel-catch 49 is a lock-release latch 50, including a lock-release cantilever 54 that projects from an end of inner wall 35. A lock-release tab 56 is positioned at the free end of lock-release cantilever 54. A recessed wall 58 is positioned in spaced relation to lock-release cantilever 54, so as to provide a recess within shelf-bracket 30 into which lock-release cantilever 54 may deflect.

Figure 7:
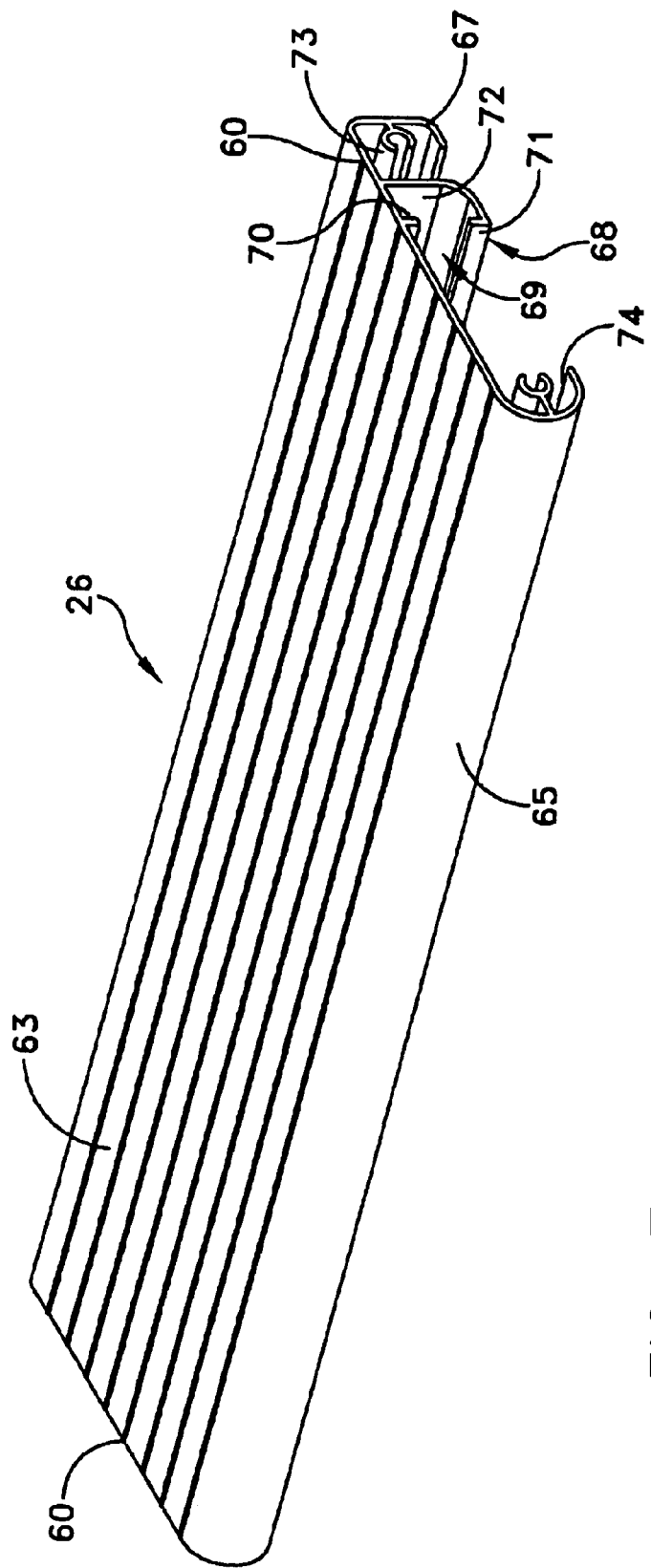
FIG. 7 is a perspective view of a shelf used in connection with the shelf-bracket of FIG. 6.
Figure 8:
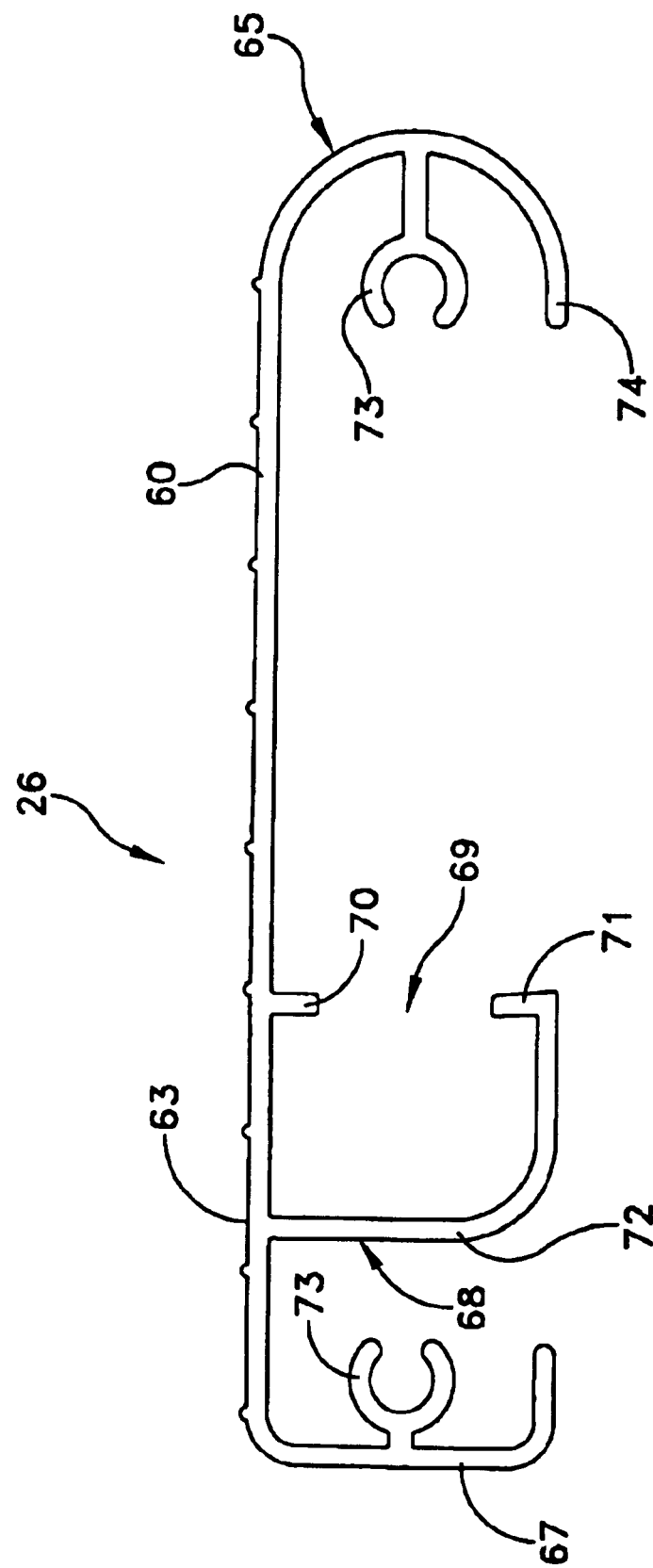
FIG. 8 is an end view of the shelf shown in FIG. 7.

Referring to FIGS. 7 and 8, shelf 26 comprises end edges 60, a top support surface 63, a nose 65, a panel flange 67, and a semi-tubular receptacle 68. More particularly, shelf 26 comprises a substantially channel shape, and may be formed by extrusion of a suitable metal or polymer, e.g., aluminum or polyvinyl chloride. Top support surface 63 separates nose 65 from panel flange 67 such that each forms a longitudinal edge of shelf 26. Nose 65 and panel flange 67 are arranged in spaced parallel relation to one another. Receptacle 68 projects downwardly from the underside of top support surface 63 in spaced relation to the inner surfaces of nose 65 and panel flange 67. A slot 69 is defined between an upper flange 70 that projects outwardly from the underside of shelf 26, and a lower flange 71 that projects upwardly from an end of a wall 72 that is arranged in spaced relation to upper flange 70 so as to define receptacle 68. Slot 69 extends longitudinally along the length of receptacle 68, with upper flange 70 and lower flange 71 typically arranged in coplanar spaced relation to one another.

Figure 9:
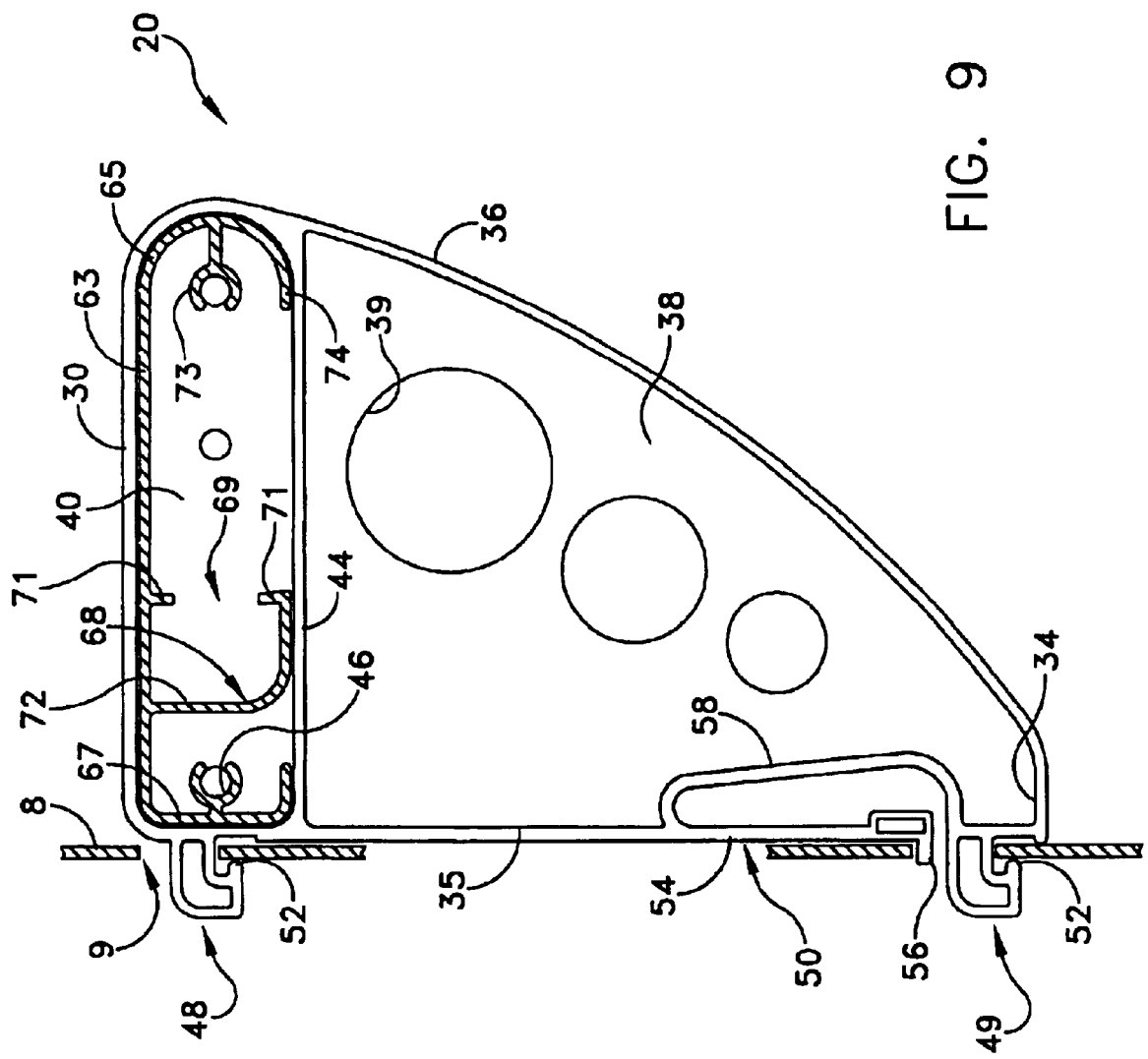
FIG. 9 is an end view of the shelf and bracket shown in FIG. 5, as assembled to a perforated panel of the present invention.

Referring to FIG. 9, item holder 20 is assembled to perforated panel 8 in the following manner. A shelf-bracket 30 is positioned on each end of shelf 26 so that upper web 40 is disposed in aligned confronting relation to an end edge 60 of shelf 26. In this position, face 36 of each shelf-bracket 30 extends downwardly from nose 65 of shelf 26. Each shelf-bracket 30 is then moved toward its respective end edge 60, until shelf 26 engages upper web 40. Once assembled, screws (not shown) may be inserted through holes 46 in upper web 40 and into semi-circular receptacles 73 so as to retain shelf-brackets 30 to shelf 26.

Once item holder 20 is fully assembled, it may be positioned anywhere on perforated panel 8 in the following manner. Each panel-catch 48, 49 of each shelf-bracket 30 is positioned in coaxial aligned relation with a corresponding set of four perforations 9 in perforated panel 8. In this position, lock-release tab 56 is positioned in confronting relation to the front surface of perforated panel 8, directly above the perforation 9 with which its corresponding lower panel-catch 49 is aligned. Once in this position, item holder 20 is moved toward perforated panel 8 until upper panel-catches 48 enter, pass through, and occupy their respective perforation 9. As this occurs, lower panel-catches 49 enter, pass through, and occupy their respective perforations 9. At the same time, lock-release tab 56 engages the front surface of perforated panel 8 directly adjacent to the perforation 9 that is occupied by lower panel-catch 49.

Once in this position, item holder 20 is moved toward perforated panel 8 until the outer surface of inner wall 35 engages the outer surface of perforated panel 8. In this position, panel-catches 48 and 49 are fully inserted within perforations 9, and lock-release latch 50 is deflected inwardly, toward recessed wall 58 of shelf-bracket 30. Item holder 20 is then moved downwardly, so that lock-tabs 52 move across the edge of perforated panel 8 that defines perforation 9, and into engagement with the rear surface of perforated panel 8 (as shown in FIG. 9). As this occurs, lock-release tab 56 of lock-release latch 50 slides along the front surface of perforated panel 8, and across the peripheral edge of perforation 9 into which lower panel-catch 49 has been previously inserted. As this occurs, lock-release cantilever 54 is released so as to move outwardly, away from recessed wall 58, such that lock-release tab 56 slides along the edge of perforated panel 8 that defines perforation 9, so as to secure shelf-bracket 30 in locked engagement with perforated panel 8. In order to remove item holder 20, it is necessary only to deflect lock-release cantilever 54 inwardly, toward recessed wall 58 and move item holder 20 upwardly relative to perforated panel 8. In this way, when lock-release tabs 56 disengage from their respective perforations 9, both shelf-brackets 30 may be slid outwardly, disengaging lock tabs 52, so that item holder 20 may be pulled from its position on perforated panel 8.

Figure 10:
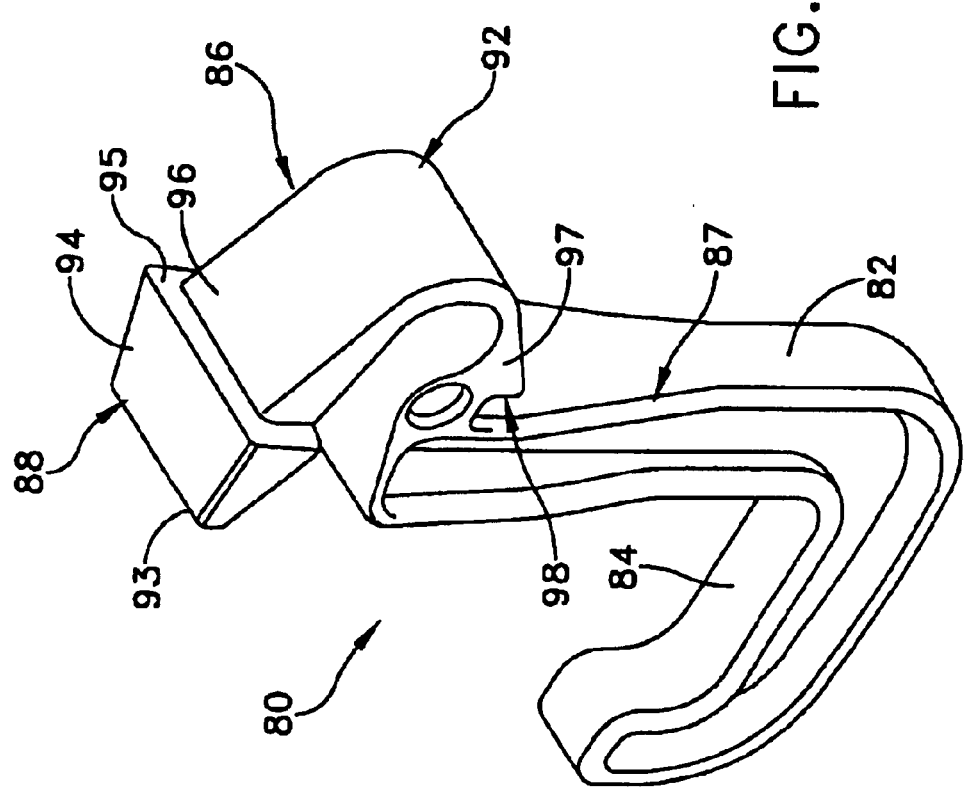
FIG. 10 is a novel hook adapted for mounting on a perforated panel or to a portion of a shelf in accordance with the present invention.
Figure 11:
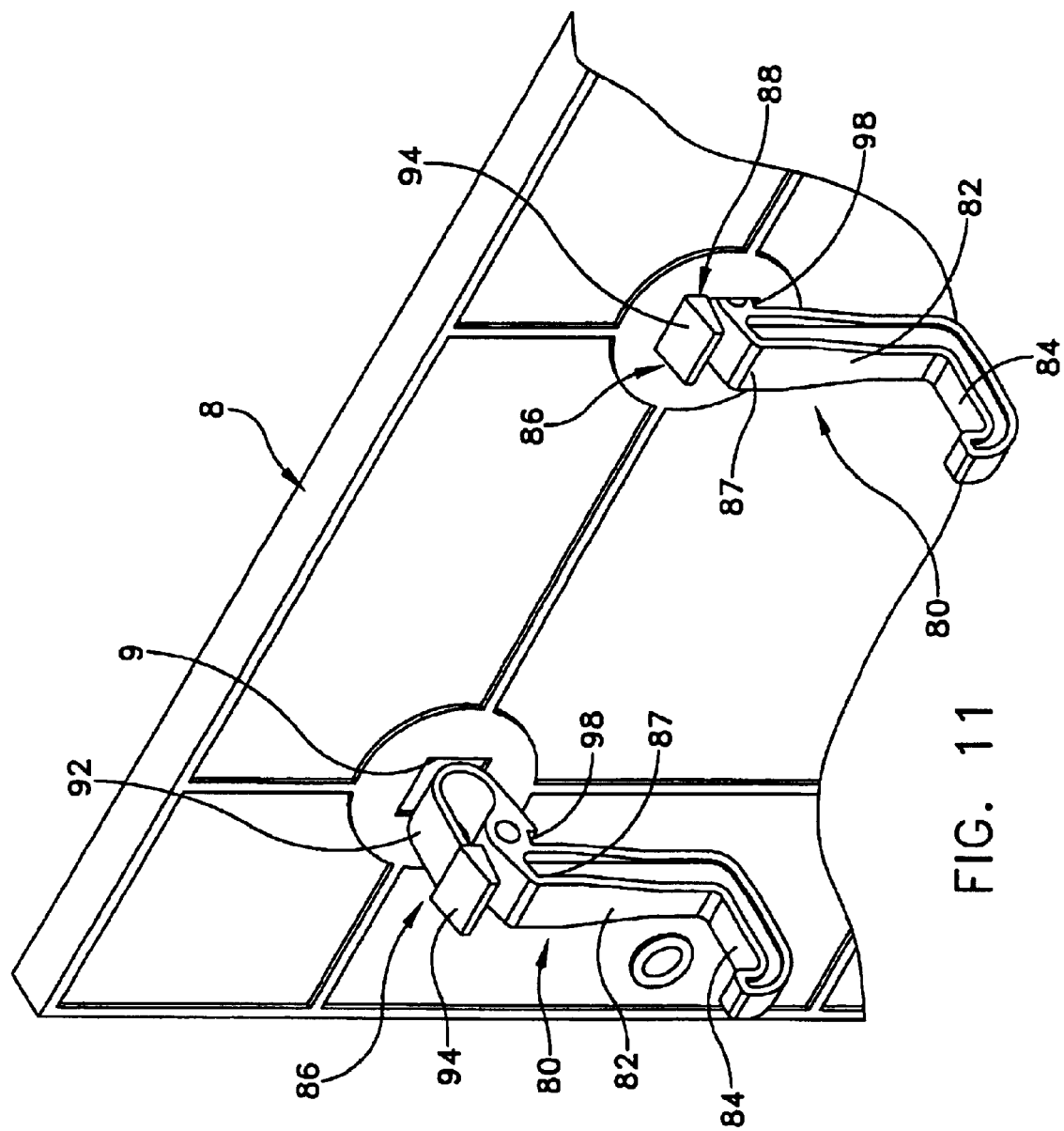
FIG. 11 is a perspective, partially exploded view of two hooks being inserted into a portion of a perforated panel in accordance with the present invention.

Item holder 20 may be used as a conventional shelf with various items being placed on top support surface 63. However, items may also be held beneath shelf 26, or on hooks 80 that are directly supported by perforated panel 8, so as to advantageously store additional items. Referring to FIGS. 10 and 11, hook 80 comprises a shank 82, a support arm 84, and a catch 86. More particularly, shank 82 and support arm 84 form a conventional hook of the type known for hanging tools and other items. Hook 80 may be formed from any of the well known polymer or metal materials that are known to exhibit good spring characteristics.

Catch 86 comprises a stop tab 88 and a cantilevered strap 92 that are located adjacent to a top portion 87 of shank 82. Stop 88 includes a nose 93, a pair of inclined surfaces forming a ramp 94, and a shoulder surface 95 so as to form a wedge-shaped tab. A first end 96 of cantilevered strap 92 projects outwardly from shoulder surface 95 and a second end 97 of cantilevered strap 92 projects outwardly from top portion 87 of shank 82, so that cantilevered strap 92 comprises a curved profile. Cantilevered strap 92 may have a variety of cross-sectional shapes, e.g., rectangular, circular, elliptical, etc., so long as a fully elastic spring is created by the structure of the strap. A transverse slot 98 is defined through the underside of cantilevered strap 92 between top portion 87 of shank 82 and second end 97 of cantilevered strap 92. Slot 98 is sized and shaped to accept a portion of lower flange 71 of receptacle 68.

Hook 80 may be assembled to any perforation 9 within perforated panel 8, as shown in FIG. 11. More particularly, hook 80 is arranged adjacent to perforated panel 8, such that support arm 84 is directed away from the outer surface of perforated panel 8 and cantilevered strap 92 is arranged in coaxially aligned, confronting relation to a perforation 9 (FIG. 11). Ramp 94 of stop 88 is then depressed, deflecting cantilevered strap 92 such that the underside of stop 88 moves toward top portion 87 of shank 82. Once in this position, hook 80 is moved toward perforation 9 until shoulder surface 95 engages the front surface of perforated panel 8 that surrounds perforation 9, and the edge of perforated panel 8 that defines a portion of perforation 9 engages slot 98 of catch 86. Pressure is then released from ramp 94 so as to allow cantilevered strap 92 to spring back towards its original, undeflected position, and thereby engage the internal edges of perforated panel 8 that define perforation 9. In order to remove catch 86 from perforated panel 8, it is only necessary to grip shank 82 and move it toward stop 88, once again deflecting cantilevered strap 92, and thereby disengaging the edge of perforated panel 8 from slot 98. Once cantilevered strap 92 is deflected, hook 80 may be withdrawn from perforated panel 8.

Figure 12:
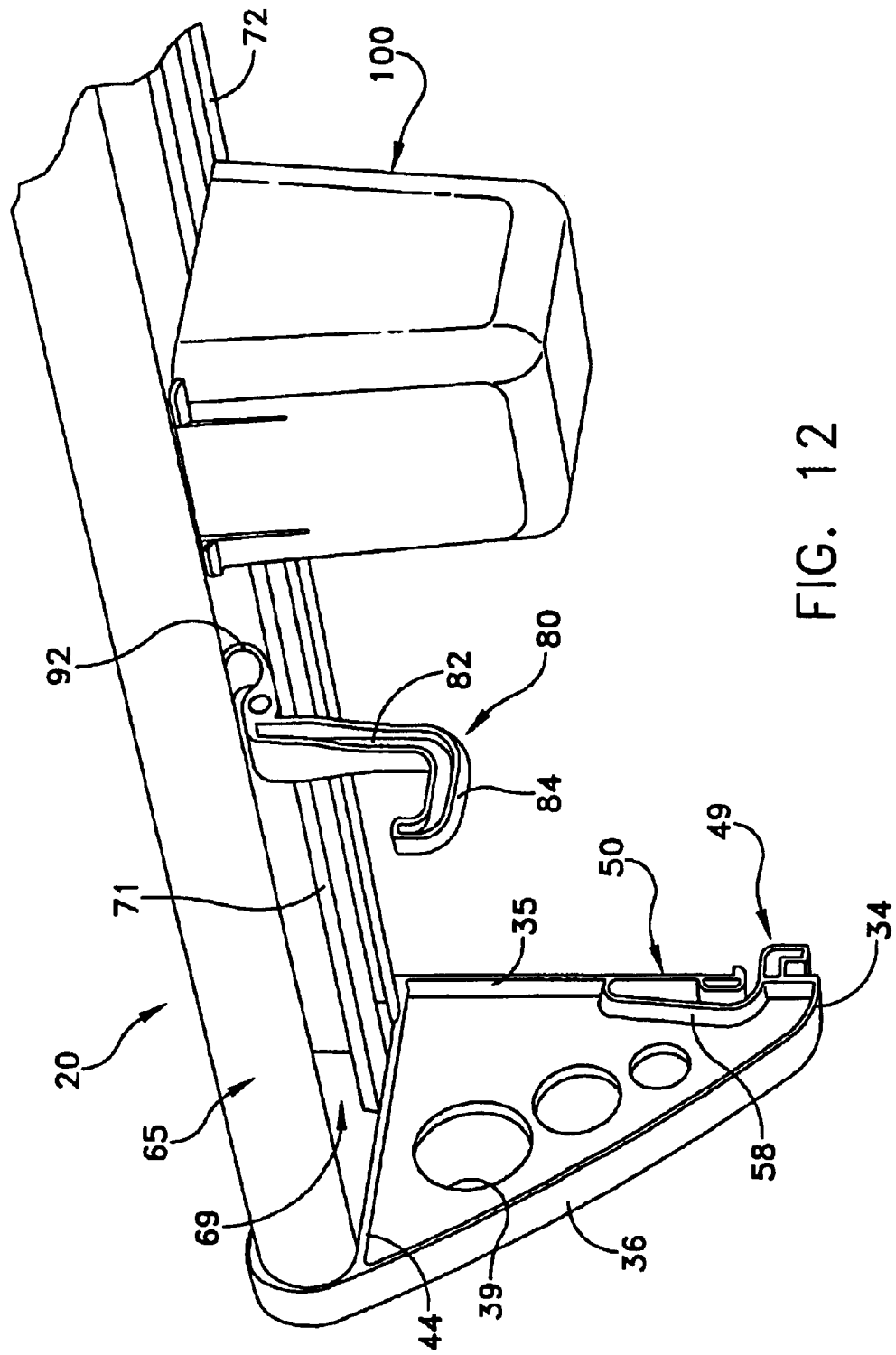
FIG. 12 is a partially broken-away, perspective view of a shelf and shelf-bracket system assembled in accordance with the present invention, and having a hook and container assembled to an interior structure.
Figure 13:
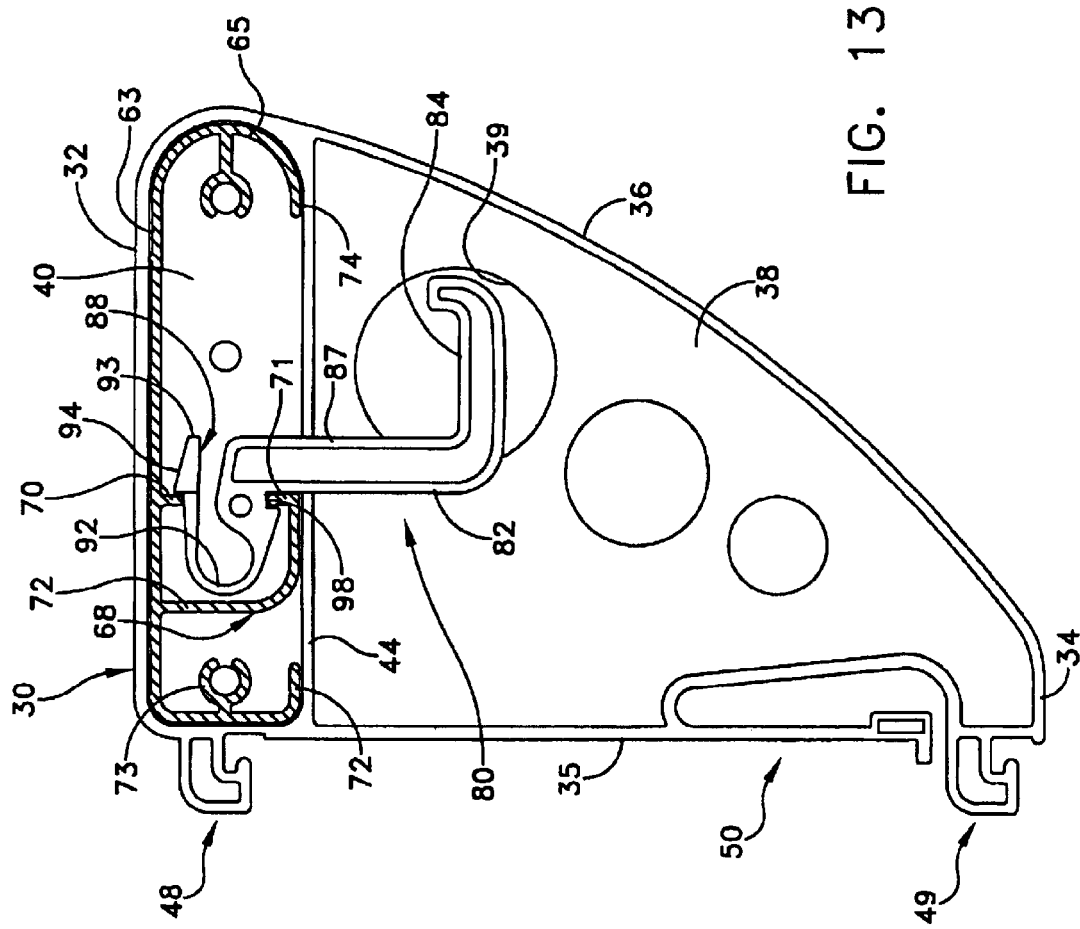
FIG. 13 is an end view of the shelf, bracket, and hook assembly shown in FIG. 12.
Figure 14:
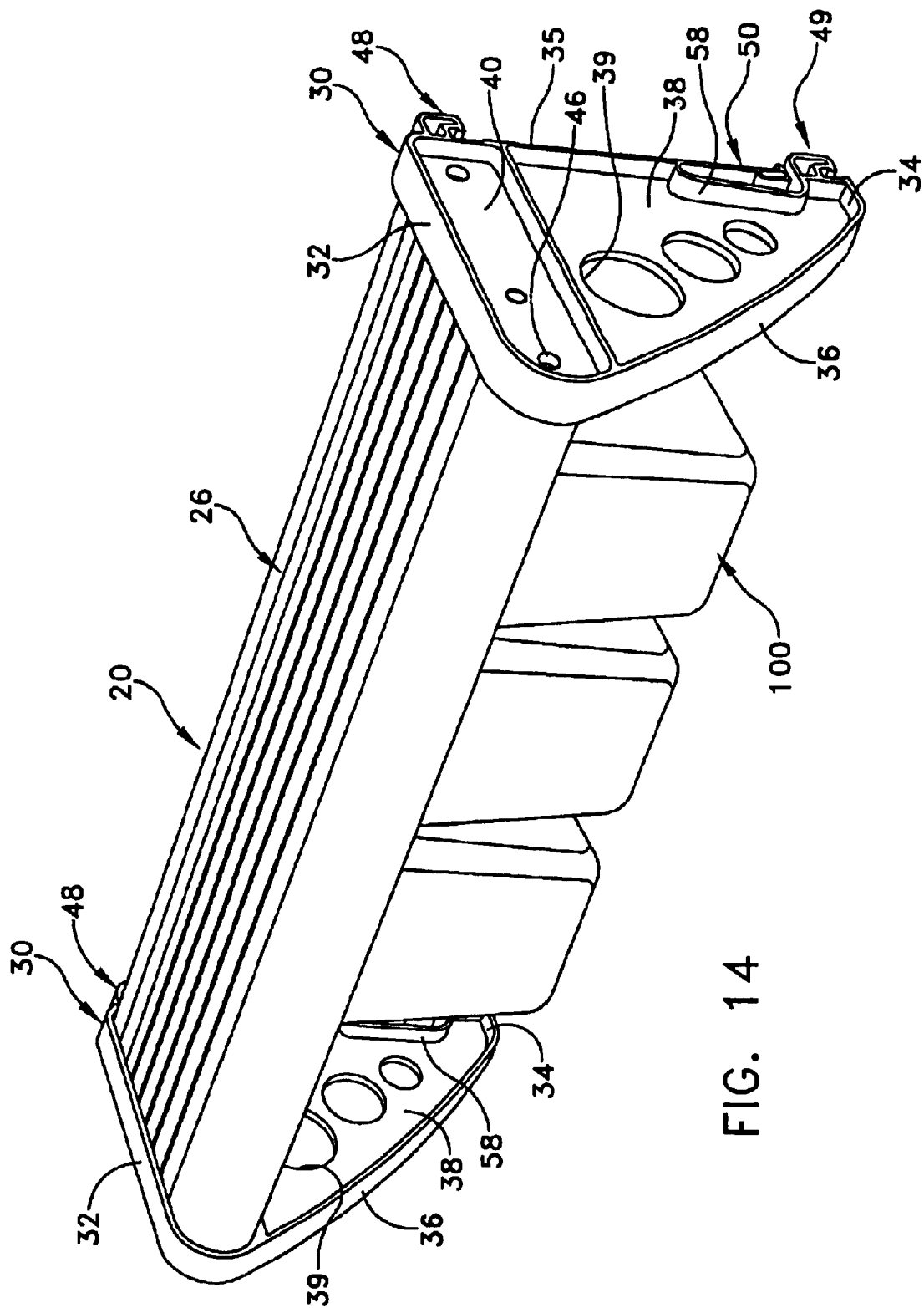
FIG. 14 is a perspective view of the item holder shown in FIG. 4, having a plurality of containers assembled to its underside.
Figure 15:
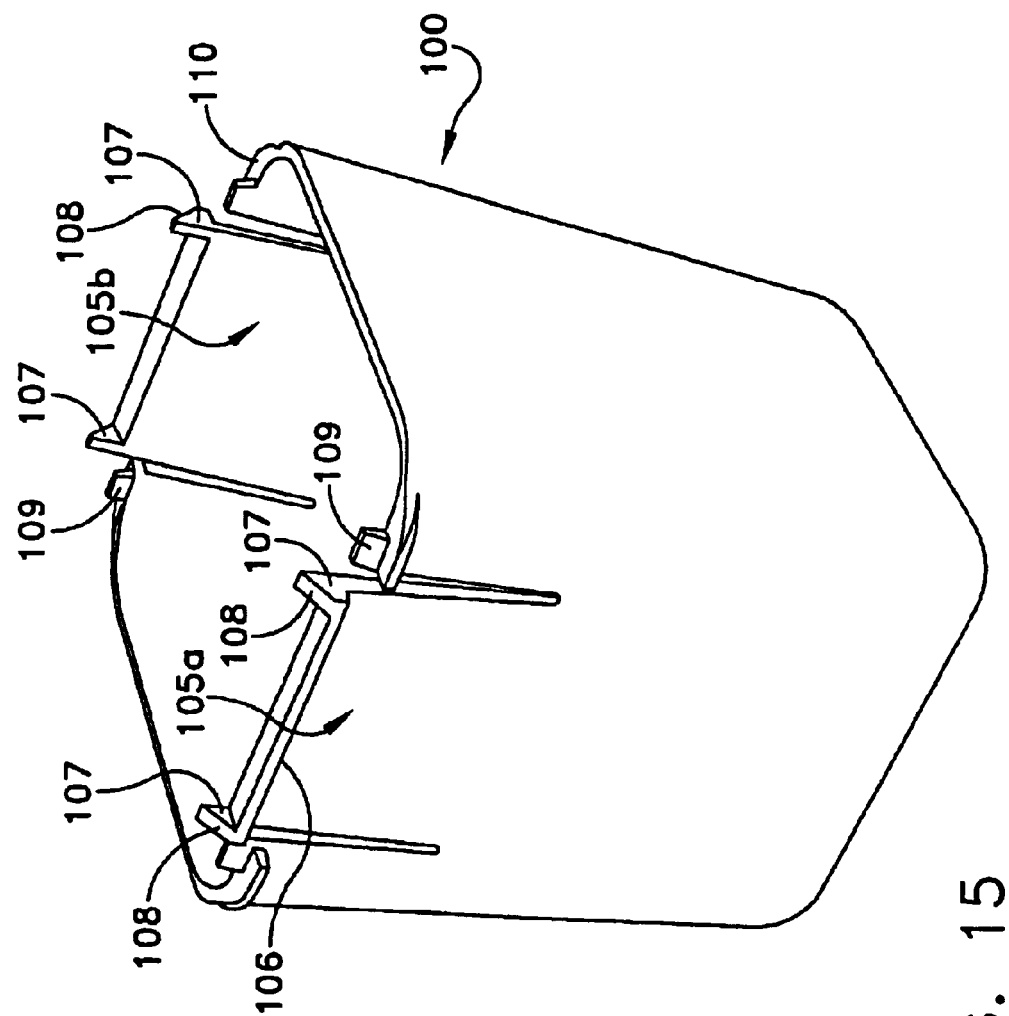
FIG. 15 is a perspective view of one of the containers shown in FIG. 14.
Figure 16:
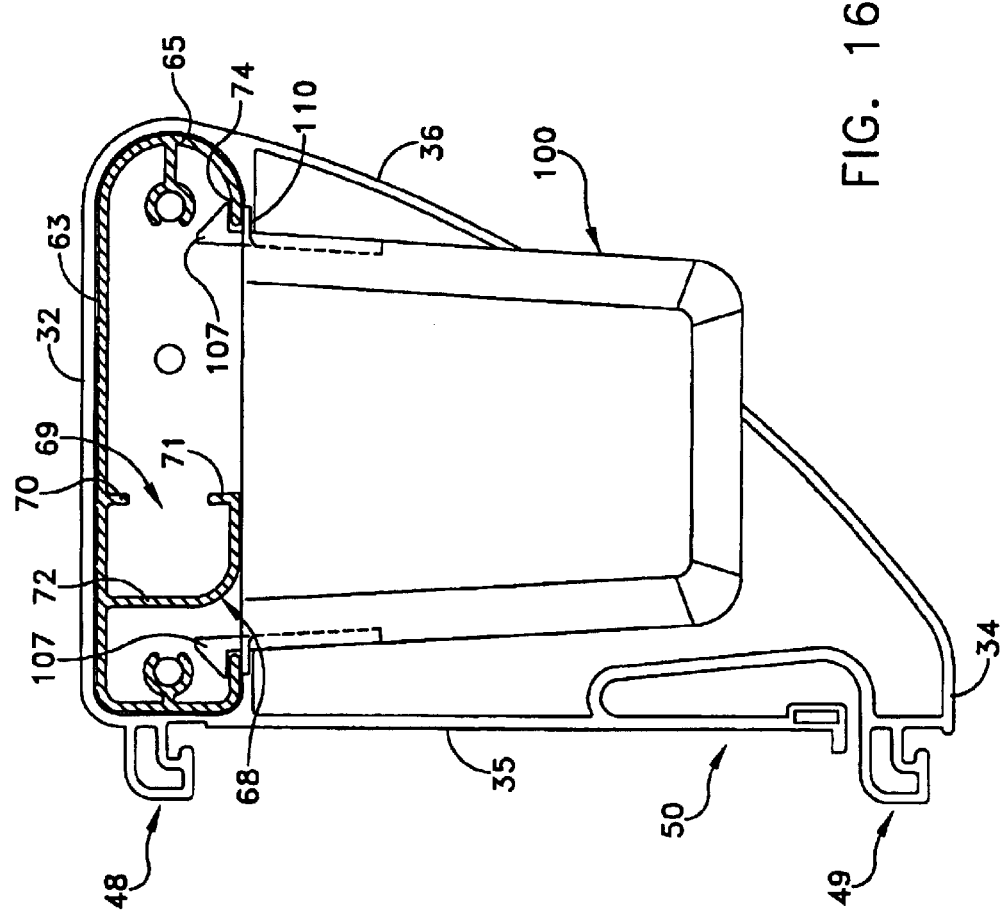
FIG. 16 is an end view of the shelf, self-bracket and container assembly shown in FIG. 14.

Referring to FIGS. 12 and 13, hook 80 may also be assembled to receptacle 68 of shelf 26 in the following manner. Hook 80 is arranged adjacent to receptacle 68 such that support arm 84 is directed away from the outer surface of perforated panel 8 and cantilevered strap 92 is arranged in coaxially aligned, confronting relation to slot 69. Ramp 94 of stop 88 is then depressed, deflecting cantilevered strap 92 such that the underside of stop 88 moves toward the top portion of shank 82. Once in this position, hook 80 is moved toward slot 69 until shoulder surface 95 engages the front surface of upper flange 70 and the upper edge of lower flange 71 engages slot 98. Once in this position, pressure is released from ramp 94 so as to allow cantilevered strap 92 to spring back towards its original, undeflected position, and thereby engage the edges of upper flange 70 and lower flange 71 that define slot 69. In order to remove hook 80 from receptacle 68, it is only necessary to grip shank 82 and move it toward stop 88, once again deflecting cantilevered strap 92, and disengaging the edge of lower flange 71 from slot 98. Once cantilevered strap 92 is deflected, hook 80 may be withdrawn from slot 69.

Referring to FIGS. 12, 14, 15, and 16, a container 100 may also be positioned on the underside of item holder 20. More particularly, container 100 comprises an open-ended receptacle having a front cantilevered latch 105a and a rear cantilevered latch 105b. Each cantilevered latch 105a, 105b comprises a shoulder 106, and a pair of spaced apart cam ears 107. Each cam ear 107 also includes a front ramp 108. Adjacent to each cam ear 107, on container 100 are upwardly projecting stops 109. Container 100 may assembled to the underside of shelf 26 through the interaction of cantilevered latches 105a, 10b with portions of shelf 26.

Figure 17:
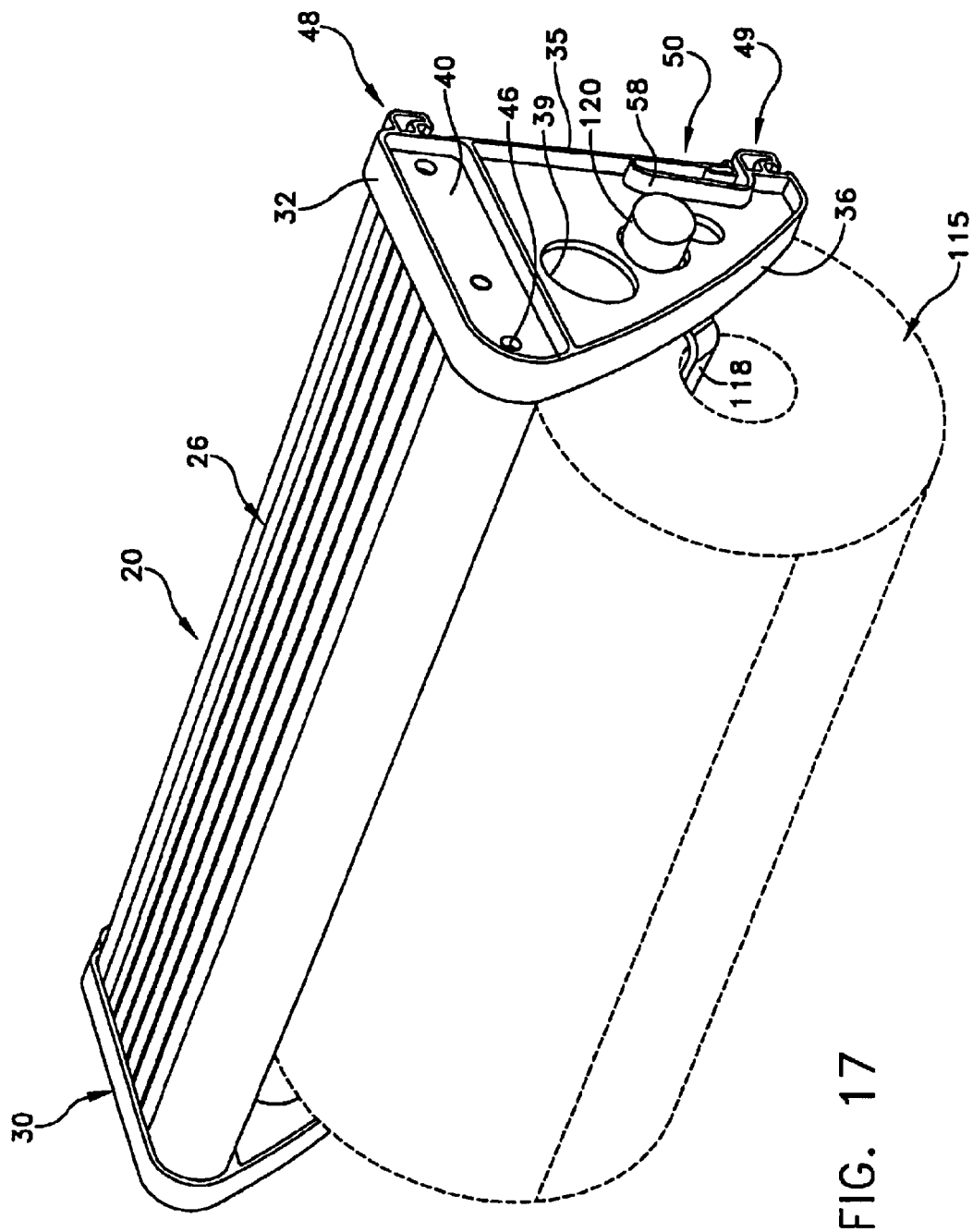
FIG. 17 is a perspective view of the item holder shown in FIG. 4, having a roll of material supported under the shelf and by the two shelf-brackets.
Figure 18:
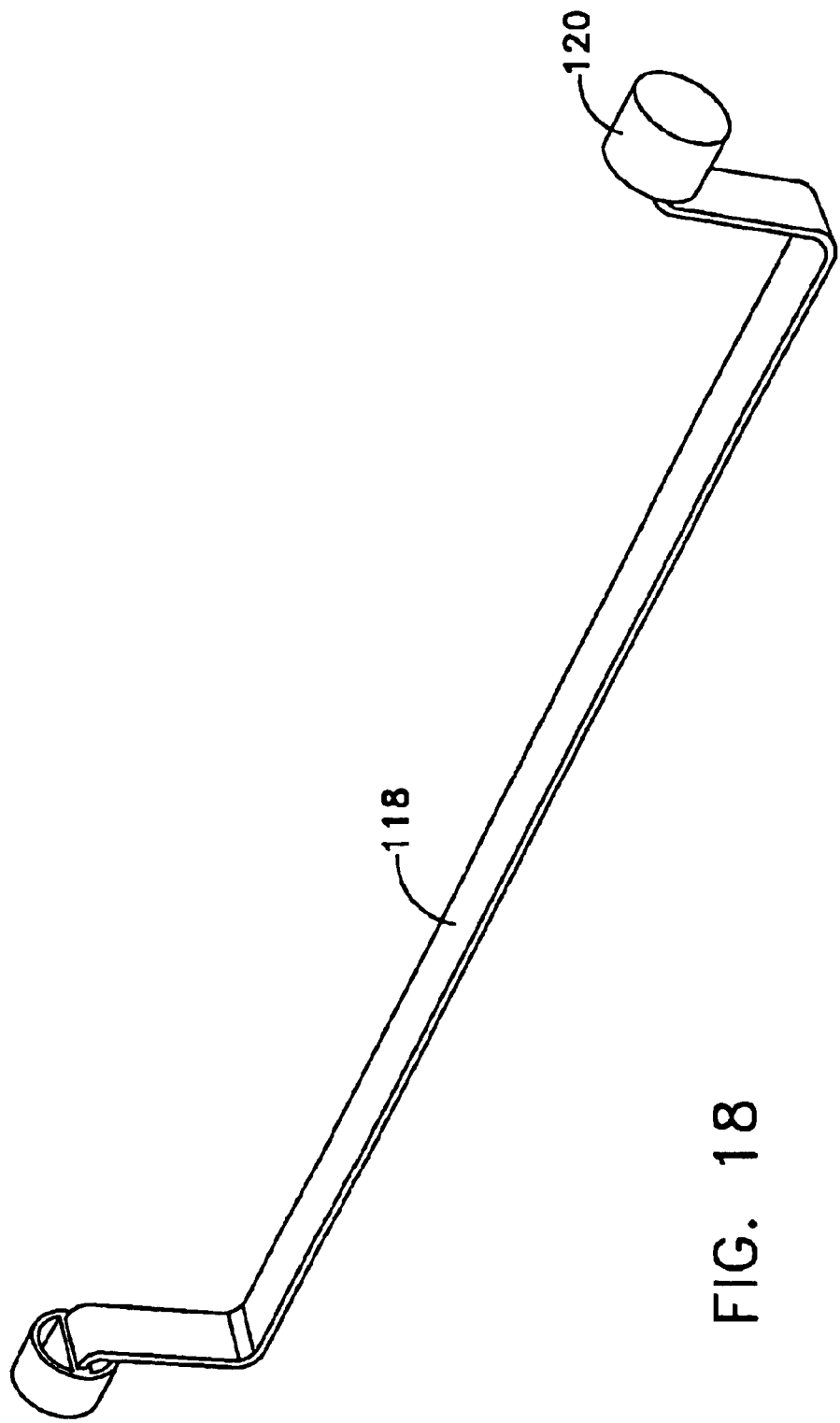
FIG. 18 is a support rod used to support a roll of material as shown in FIG. 17.
Figure 19:
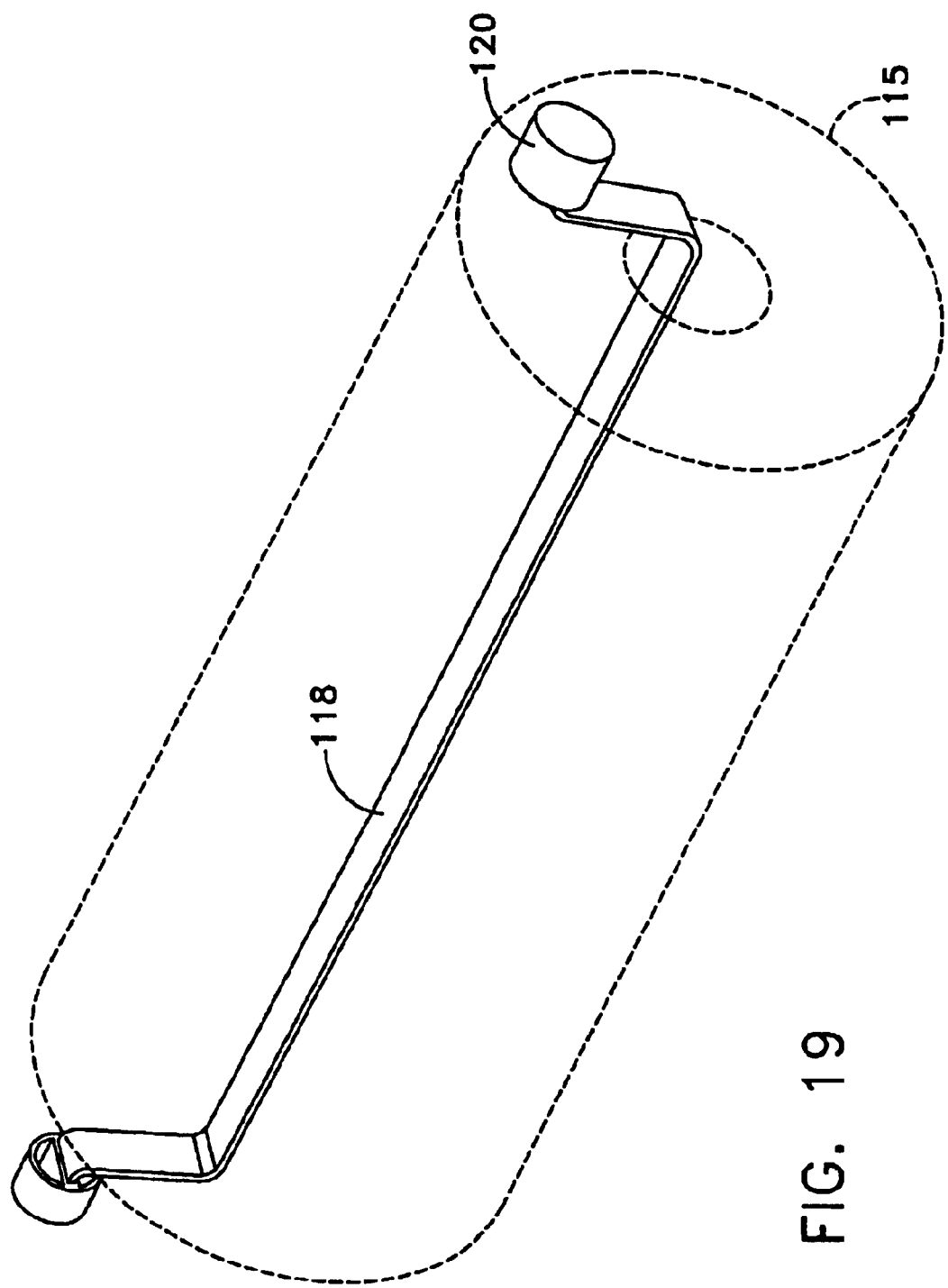
FIG. 19 is a perspective view, partially in phantom, of the rod and roll shown in FIG. 17, with the shelf and brackets removed for clarity of illustration.
Figure 20:
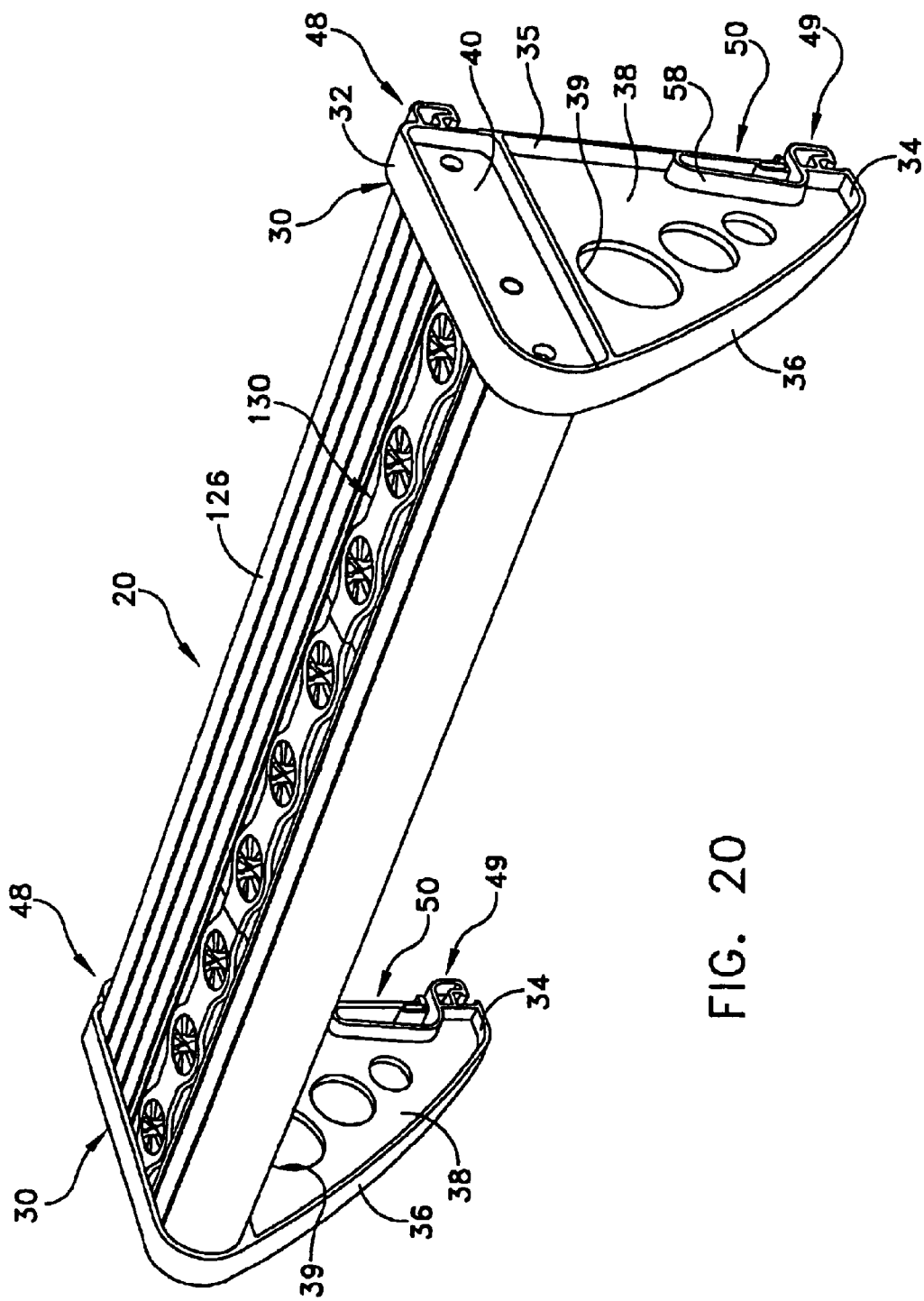
FIG. 20 shows another embodiment of the item holder shown in FIG. 4, and having a tool holder formed within the shelf.
Figure 21:
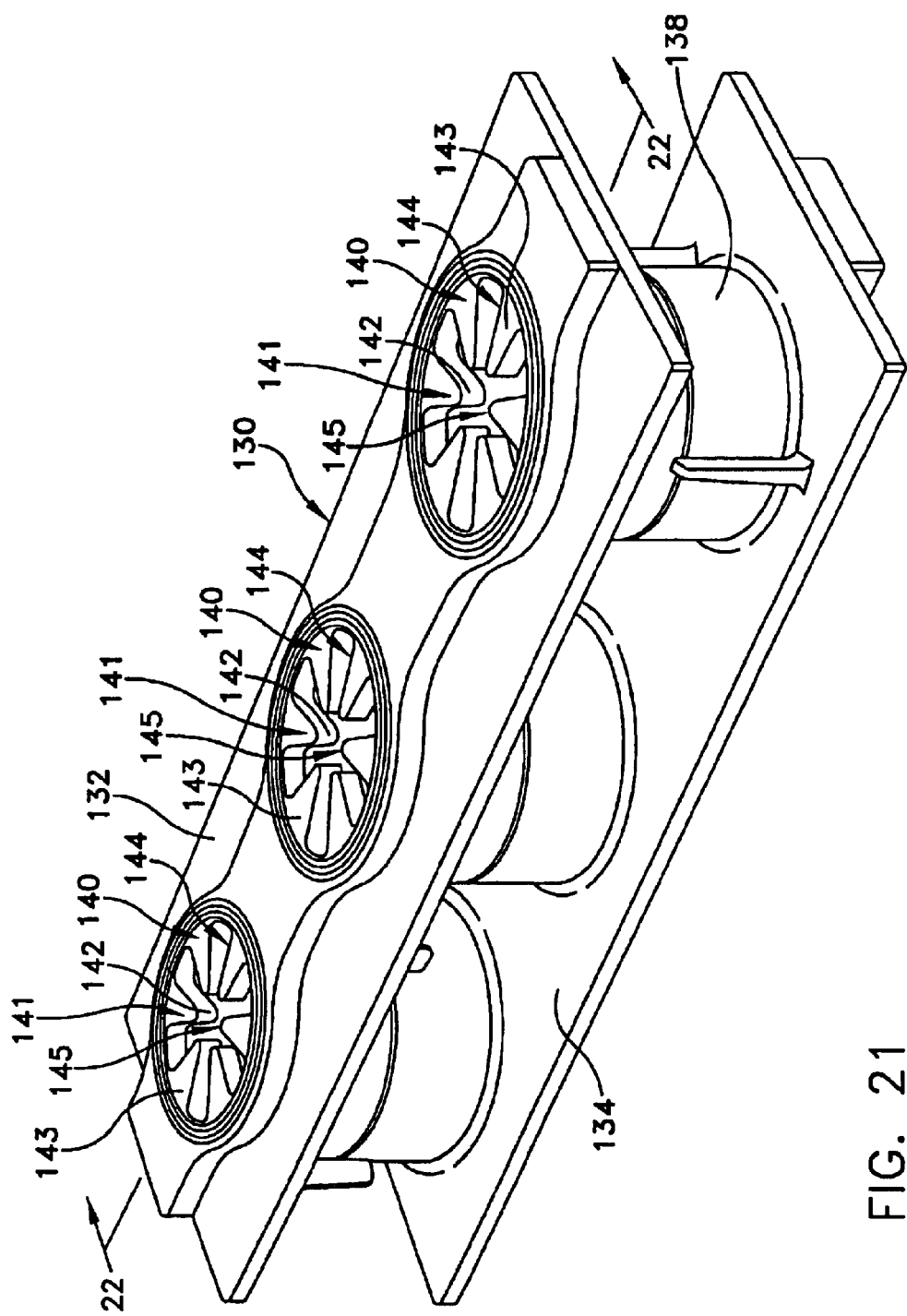
FIG. 21 is a perspective view of a tool holder of the type shown in FIG. 20.
Figure 22:
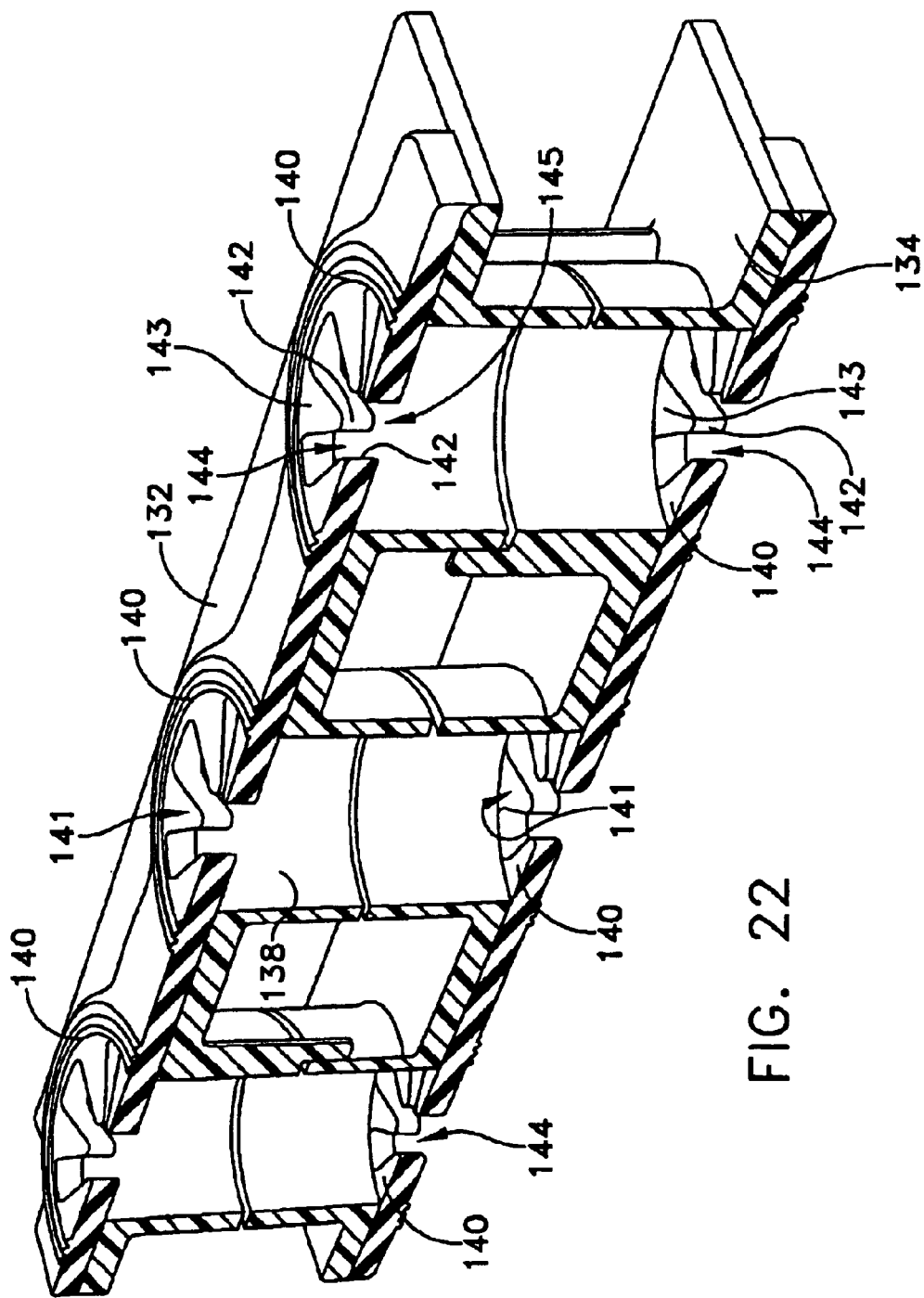
FIG. 22 is a cross-sectional view of the tool holder, as taken along lines 22—22 in FIG. 21.

Referring to FIGS. 17, 18, and 19, a roll of material, e.g., paper towels, wrapping paper, plastic wrap, etc., may be suspended between shelf-brackets 30 and below shelf 26 for convenient access. More particularly, a rod 118 comprises a pair of supports 120 positioned at each end. Rod 118 is inserted through the roll of material, and supports 120 are inserted into support openings 39 within lower web 38 of each shelf-bracket 30.

Item holder 20 may also comprise a shelf 126 including a hand tool holder 130 that supports hand tools, e.g., screwdrivers, nut drivers, awls, pliers, hand socket wrenches, etc., in an upright, vertical orientation, so as to improve the esthetics and accessibility of the tools (FIGS. 20–24).

More particularly, tool holder 130 is positioned within shelf 126, and comprises a top 132, a bottom 134, and a plurality of tubes 138 that are positioned between top 132 and bottom 134. A pair of disk-shaped flexible tool support members 140 are positioned in top 132 and bottom 134, and within each tube 138. Each disk-shaped flexible tool support member 140 comprises a plurality of resilient fingers 141, with each finger often comprising a triangular shape having a tip 142 and a base 143. Each finger 141 is oriented so that its tip 142 is directed radially inwardly toward the central axis of tube 138. Fingers 141 are normally arranged in coplanar relation to one another. A radially extending space or gap 144 is defined between each finger 141, along their respective lengths, with tips 142 positioned in spaced relation to one another and in coaxial relation to a longitudinal axis of each tube 138. A central aperture 145 is defined by tips 142.

Figure 4:
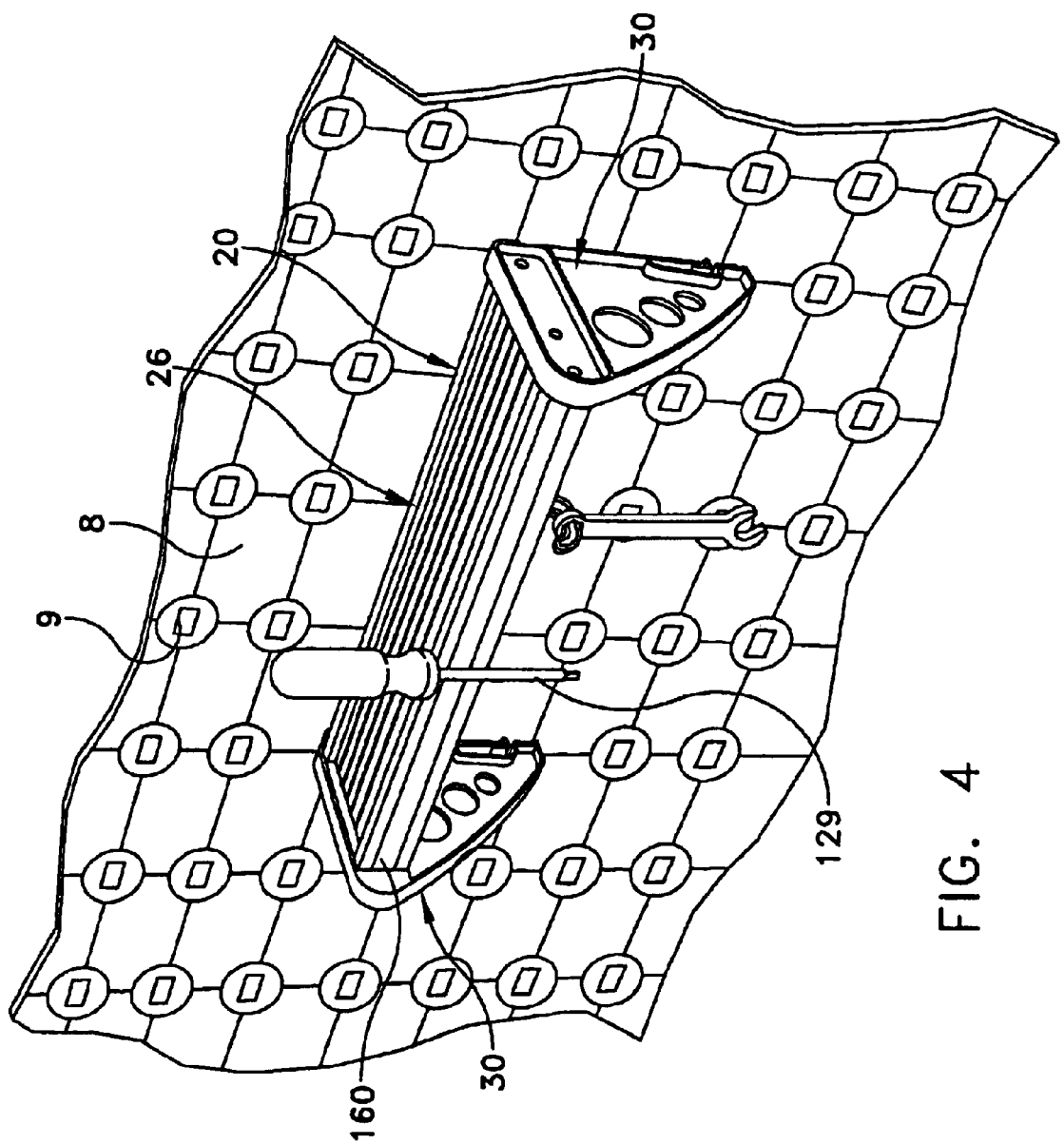
FIG. 4 is a broken-away, perspective view of a perforated panel and item holder formed in accordance with the present invention.
Figure 23:
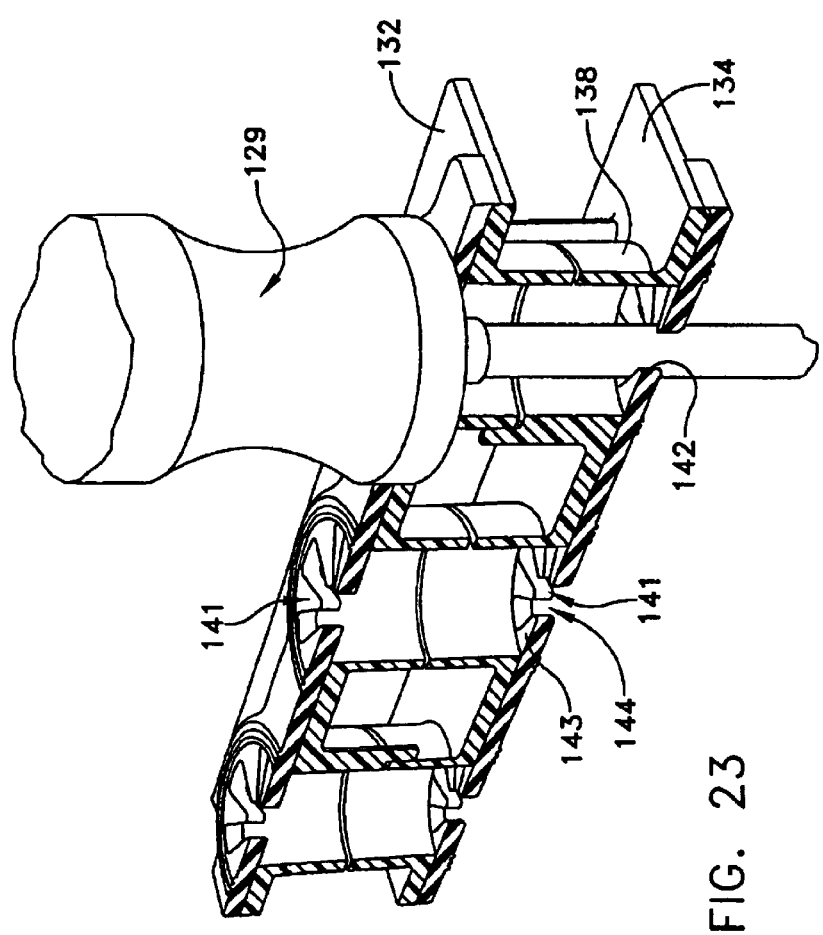
FIG. 23 is a cross-sectional view of the tool holder similar to FIG. 22, having a tool mounted within the tool holder.
Figure 24:
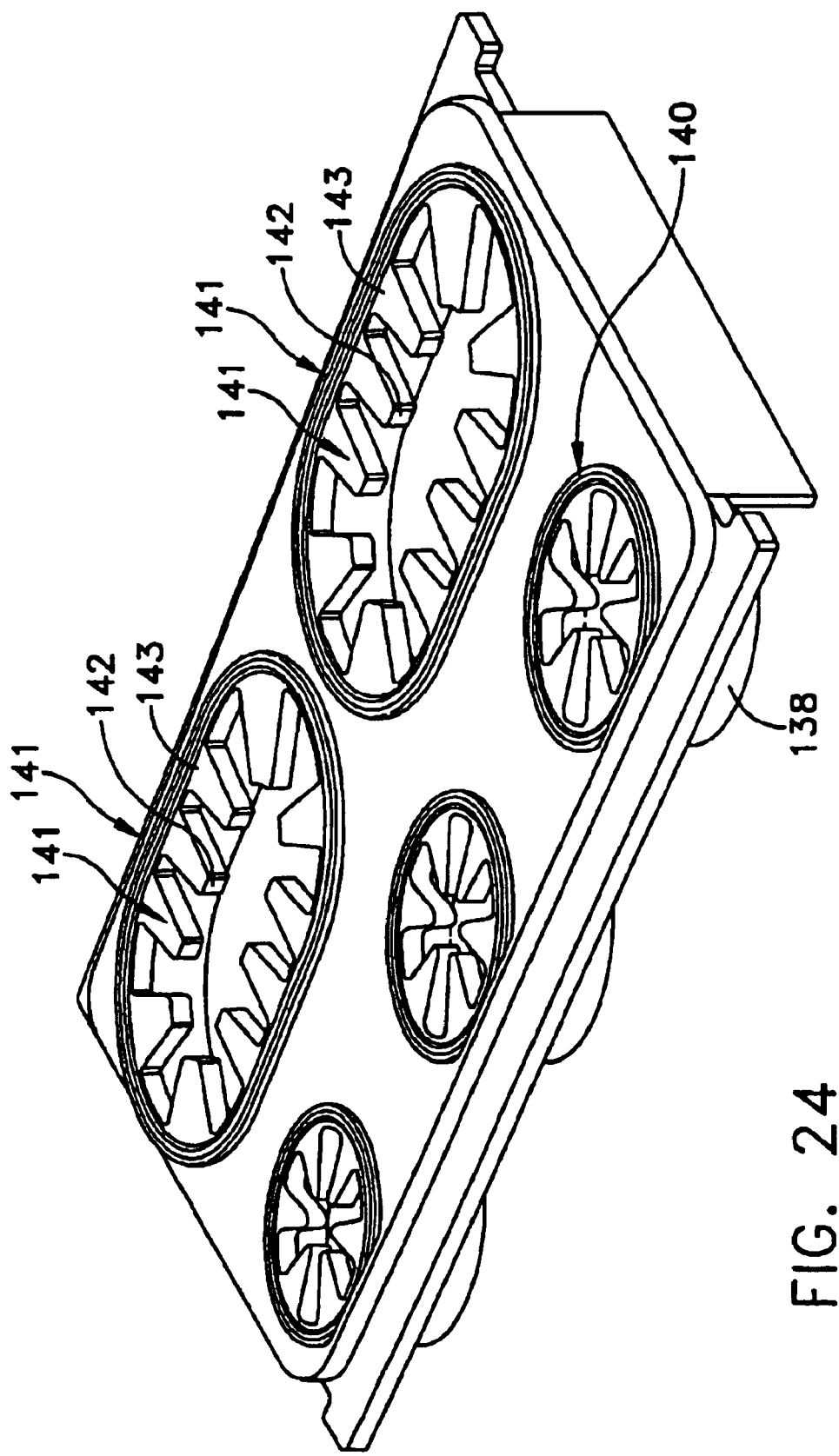
FIG. 24 is a perspective view of an alternative tool holder formed in accordance with the present invention.

When a tool, e.g., screwdriver 129 in FIGS. 4 and 23, is inserted through tool holder 130, its shaft enters central opening 145 and engages tips 142 of fingers 141. Fingers 141, in turn, deflect downwardly while at the same time exerting a force against the shaft sufficient to hold the tool between fingers 141 so that the tool does not wobble or flop over, and is therefore in an upright position, readily accessible. It will be understood that fingers 141 do not necessarily have to be arranged in a circular pattern, but may also comprise, e.g., an oval 146, as shown in FIG. 24. Also, numerous holders 130 may be positioned within shelf 126, as needed. Moreover, shelf 126 is assembled to shelf-brackets 130 and perforated panel 8 in the same way that shelf 26 is assembled to shelf-brackets 30 and perforated panel 8.

Figure 25:
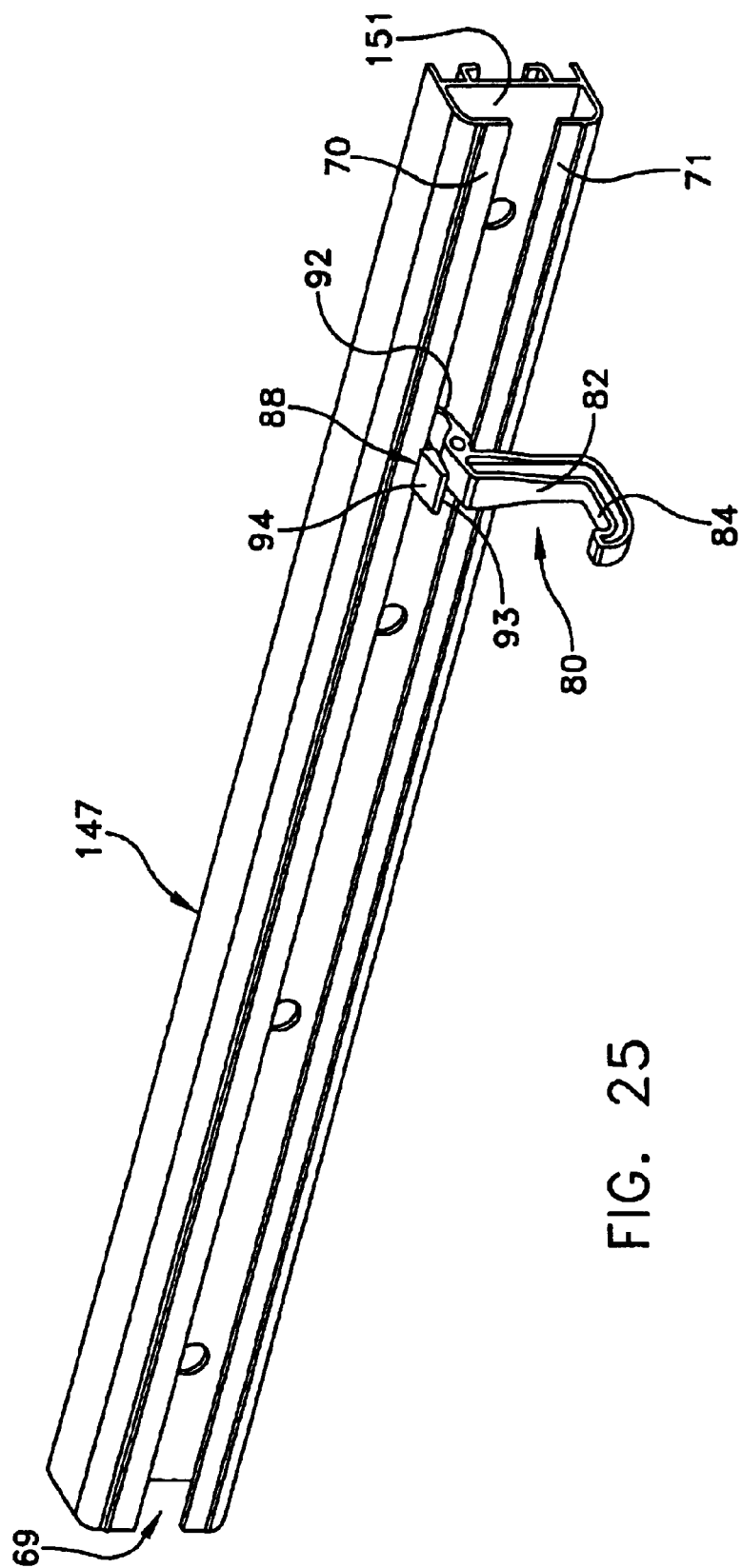
FIG. 25 is a perspective view of a receptacle and hook system formed in accordance with the present invention.
Figure 26:
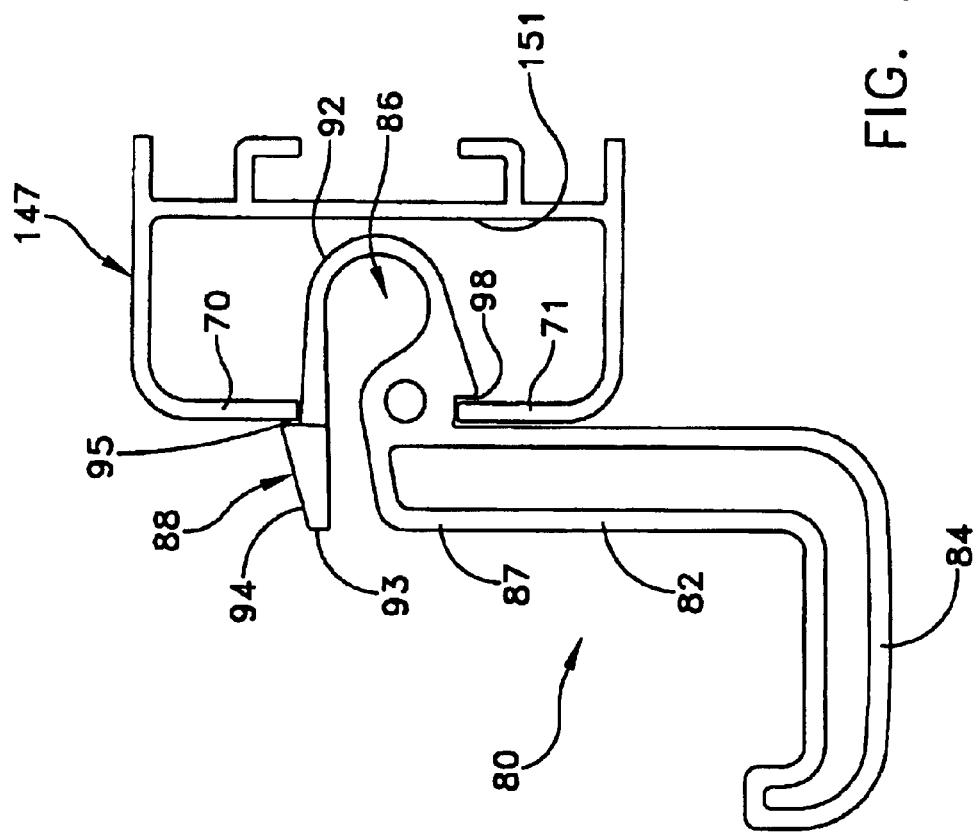
FIG. 26 is a side elevational view of the receptacle and hook system shown in FIG. 25.

Referring to FIGS. 25–33, alternative item holders may be used in connection with storage system 5. For example, a bracket receptacle 147 that is substantially identical to receptacle 68 may be formed as a stand-alone device and appended from perforated panel 8 (FIGS. 25 and 26). Bracket receptacle 147 includes a slot 69 that is defined between an upper flange 70 and a lower flange 71 that each project outwardly from a base plate 151. Base plate 151 may be supported upon perforated panel 8 by fasteners that engage perforations 9, e.g., by catch 86. Slot 69 extends longitudinally along the length of bracket receptacle 147, with upper flange 70 and lower flange 71 typically arranged in coplanar spaced relation to one another.

Hook 80 may also be assembled to receptacle 147 in the following manner. Hook 80 is arranged adjacent to bracket receptacle 147 such that support arm 84 is directed away from the outer surface of perforated panel 8 and cantilevered strap 92 is arranged in coaxially aligned, confronting relation to slot 69. Ramp 94 of stop 88 is then depressed, deflecting cantilevered strap 92 such that the underside of stop 88 moves toward the top portion of shank 82. Once in this position, hook 80 is moved toward slot 69 until shoulder surface 95 engages the front surface of upper flange 70 and the upper edge of lower flange 71 engages slot 98. Once in this position, pressure is released from ramp 94 so as to allow cantilevered strap 92 to spring back towards its original, undeflected position and thereby engage the edges of upper flange 70 and lower flange 71 that define slot 69. In order to remove hook 80 from bracket receptacle 147, it is only necessary to grip shank 82 and move it toward stop 88, once again deflecting cantilevered strap 92, and disengaging the edge of lower flange 71 from slot 98. Once cantilevered strap 92 is deflected, hook 80 may be withdrawn from slot 69.

Figure 27:
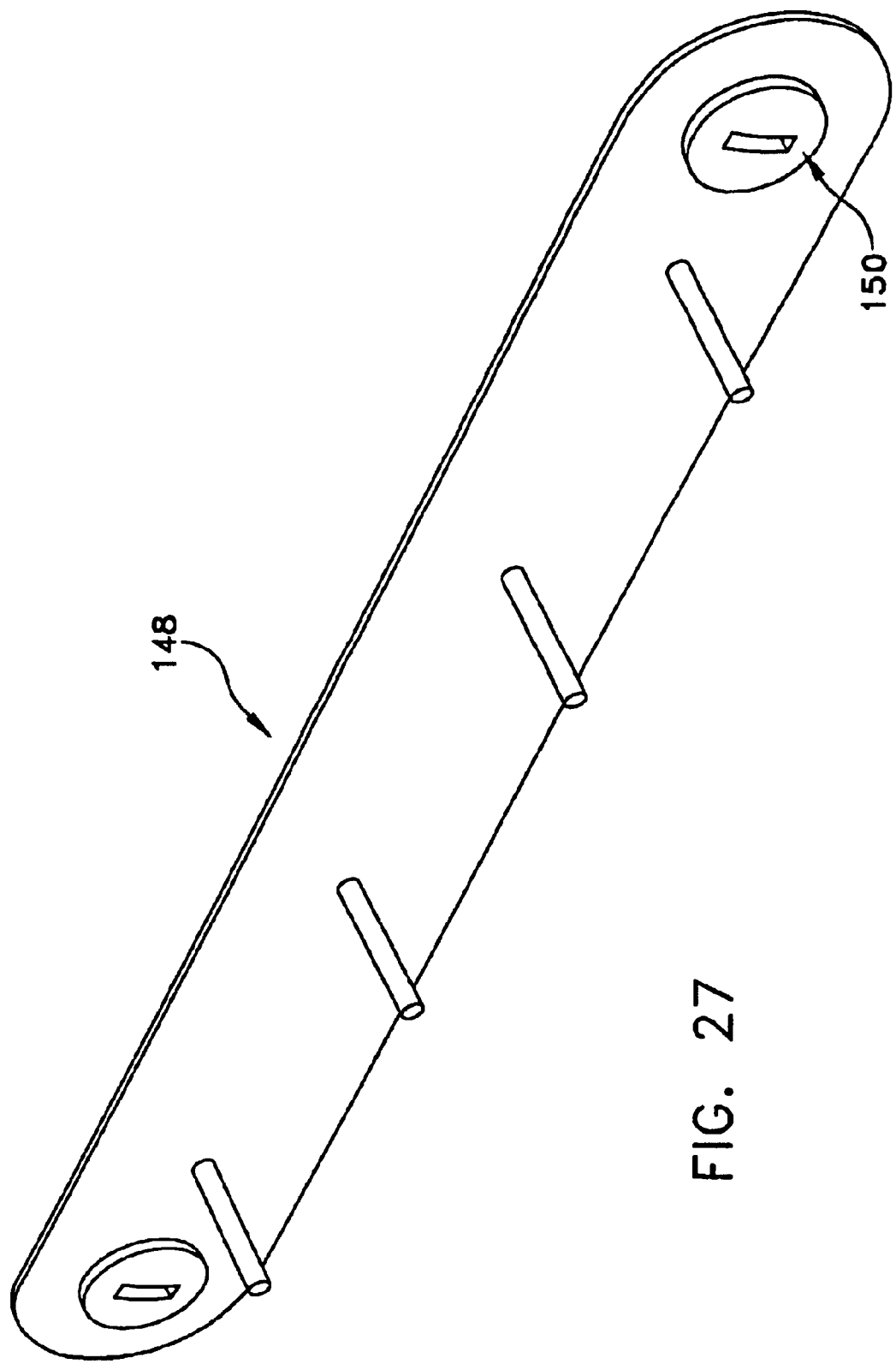
FIG. 27 is a post bracket that may be mounted to a perforated panel formed in accordance with the present invention by use of the lock button shown in FIG. 29.

Referring to FIG. 27, a post bracket 148 or receptacle bracket 149 may be held in place on perforated panel 8 by lock buttons 150 (FIG. 26). More particularly, lock buttons 150 comprise a rectilinear cam 154, a face plate 156, and a tool receptacle 158. Lock buttons 150 are sized, shaped, and arranged so that cam 154 may be slidingly received within a perforation 9. More particularly, cam 54 is first positioned in coaxial-aligned relation with a correspondingly shaped perforation 19, positioned within post bracket 148 or receptacle bracket 149. Both lock button 150, post bracket 148 or receptacle bracket 149 are then positioned in engaged relation with perforated panel 8, such that perforations 9 and 19 are coaxially aligned. Once in this position, lock button 150 is inserted through perforations 9 and 19, with rectilinear cam 154 oriented so as to correspond with the profile of perforations 9 and 19. Once inserted through perforations 9 and 19, face plate 156 is rotated, clockwise or counter-clockwise, by a tool inserted within tool mount 158, such that cam 154 rotates out of alignment with the internal edges of perforated panel 8 that define perforations 9 and 19.

Figure 28:
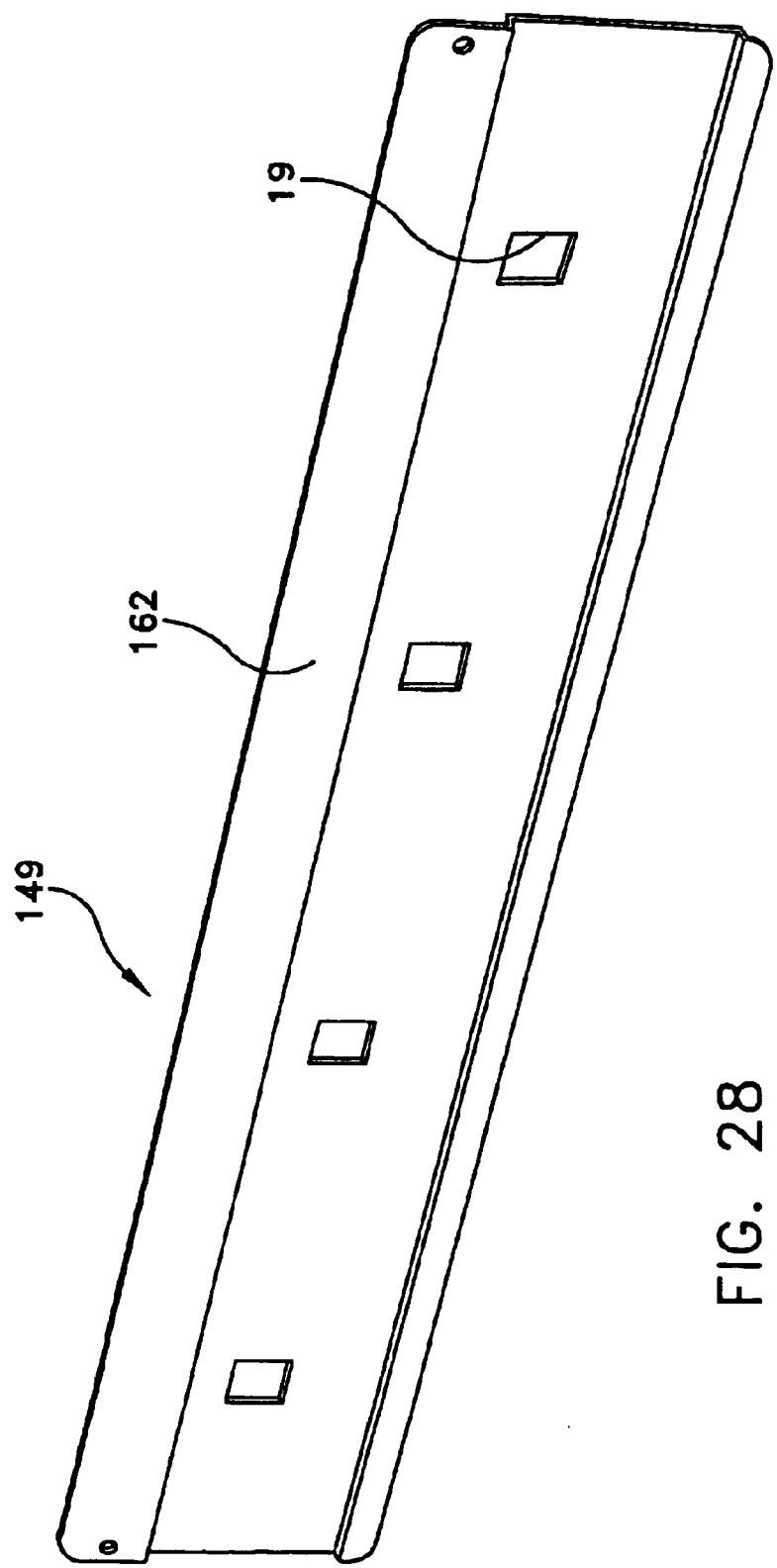
FIG. 28 is a receptacle support bracket.

Post bracket 148 may have a plurality of outwardly projecting posts, hooks, clamps, or a magnetic strip 160 (shown in FIG. 4 in connection with shelf 26) for hanging various tools or materials, as needed. Likewise, such means for hanging tools may also be combined with shelves 26 or 126, as desired. Receptacle bracket 149 includes a hook 162 that is adapted to engage a corresponding hook on an open faced receptacle 168, that may be hung from receptacle bracket 148. Likewise, an angled shelf 170 may be assembled to perforated panel 8 via lock buttons 150 in a similar manner (FIG. 28).

Figure 29:
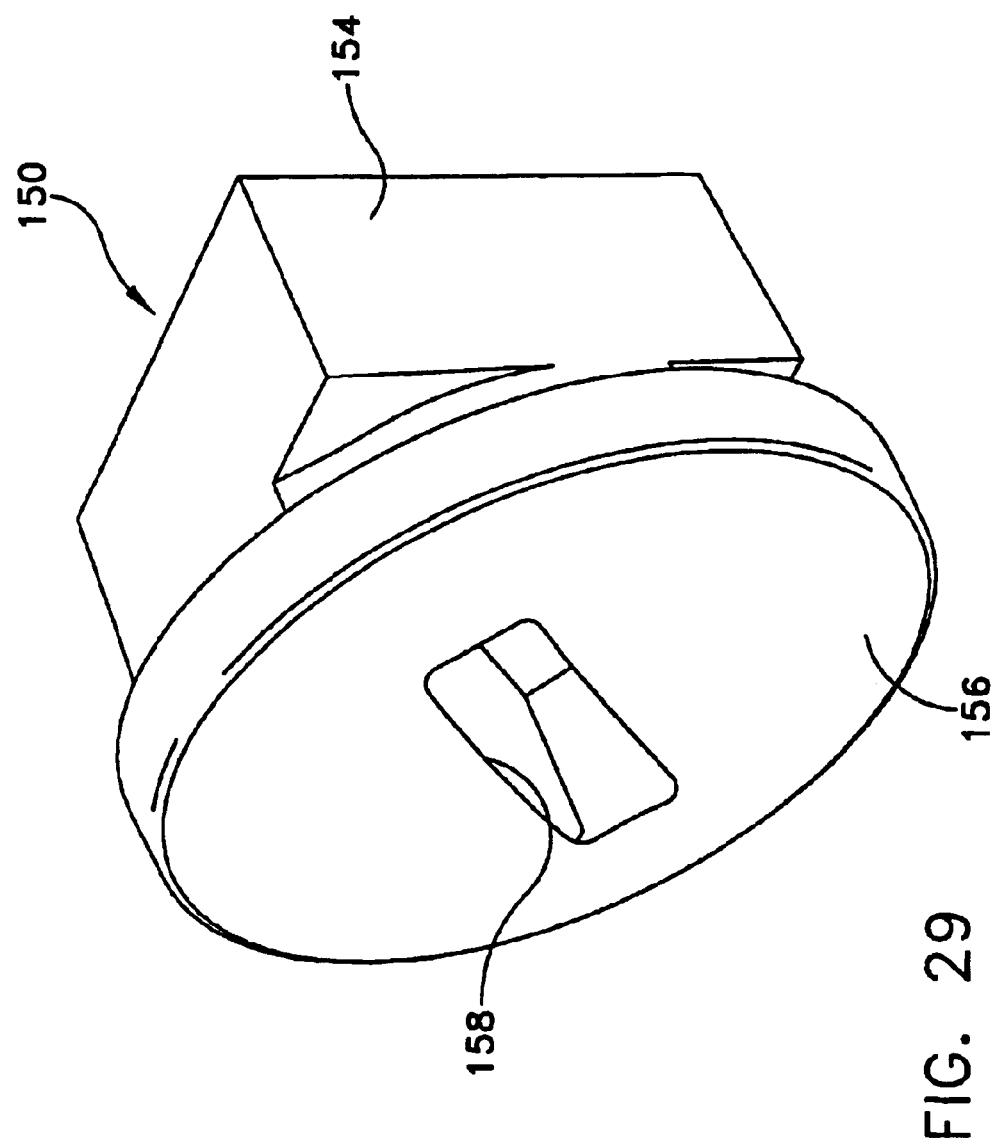
FIG. 29 is a perspective view of a lock-button used in accordance with the present invention.
Figure 30:
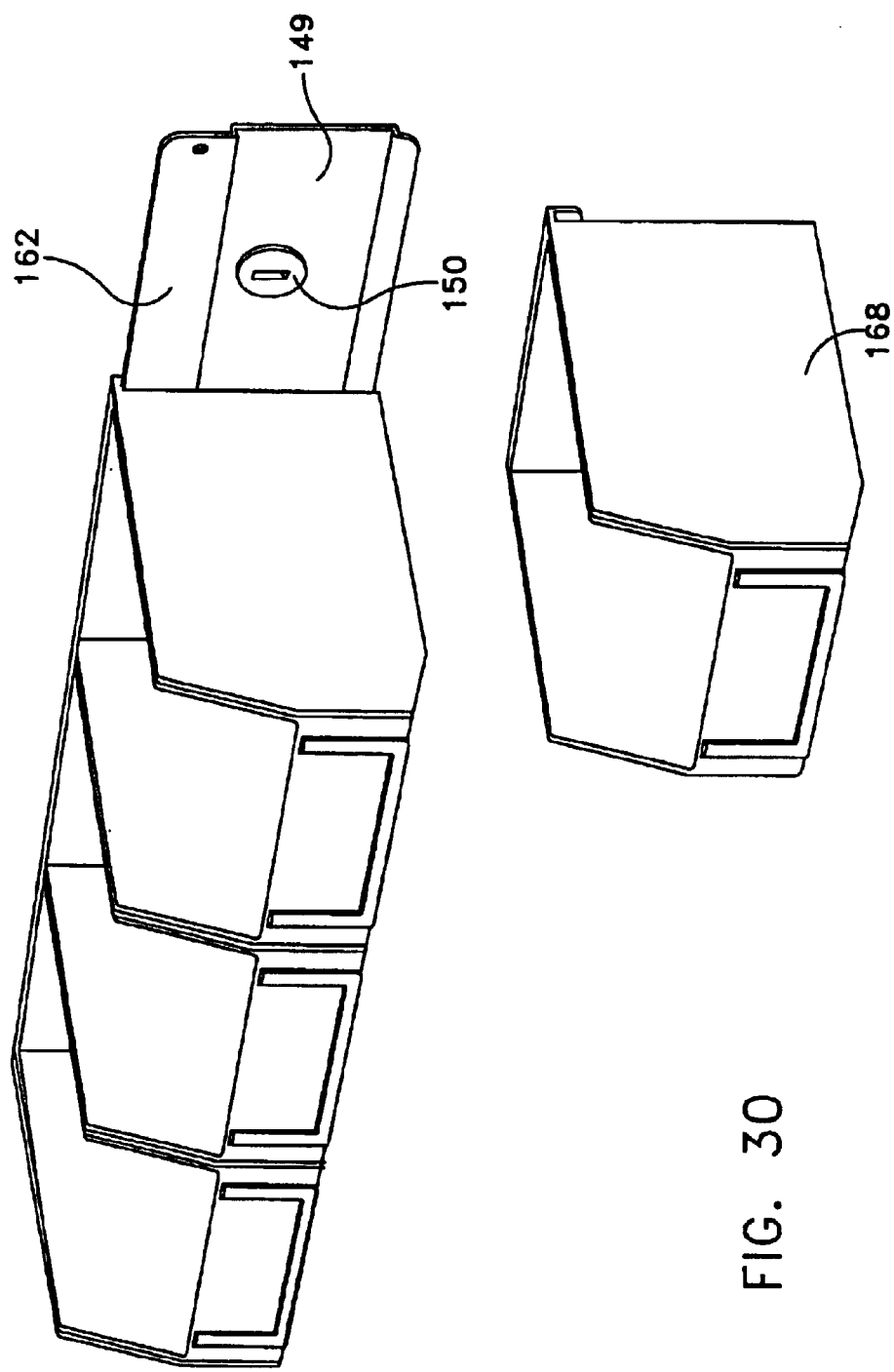
FIG. 30 is a perspective view of a receptacle support bracket as shown in FIG. 28, supporting a plurality of open faced receptacles.
Figure 31:
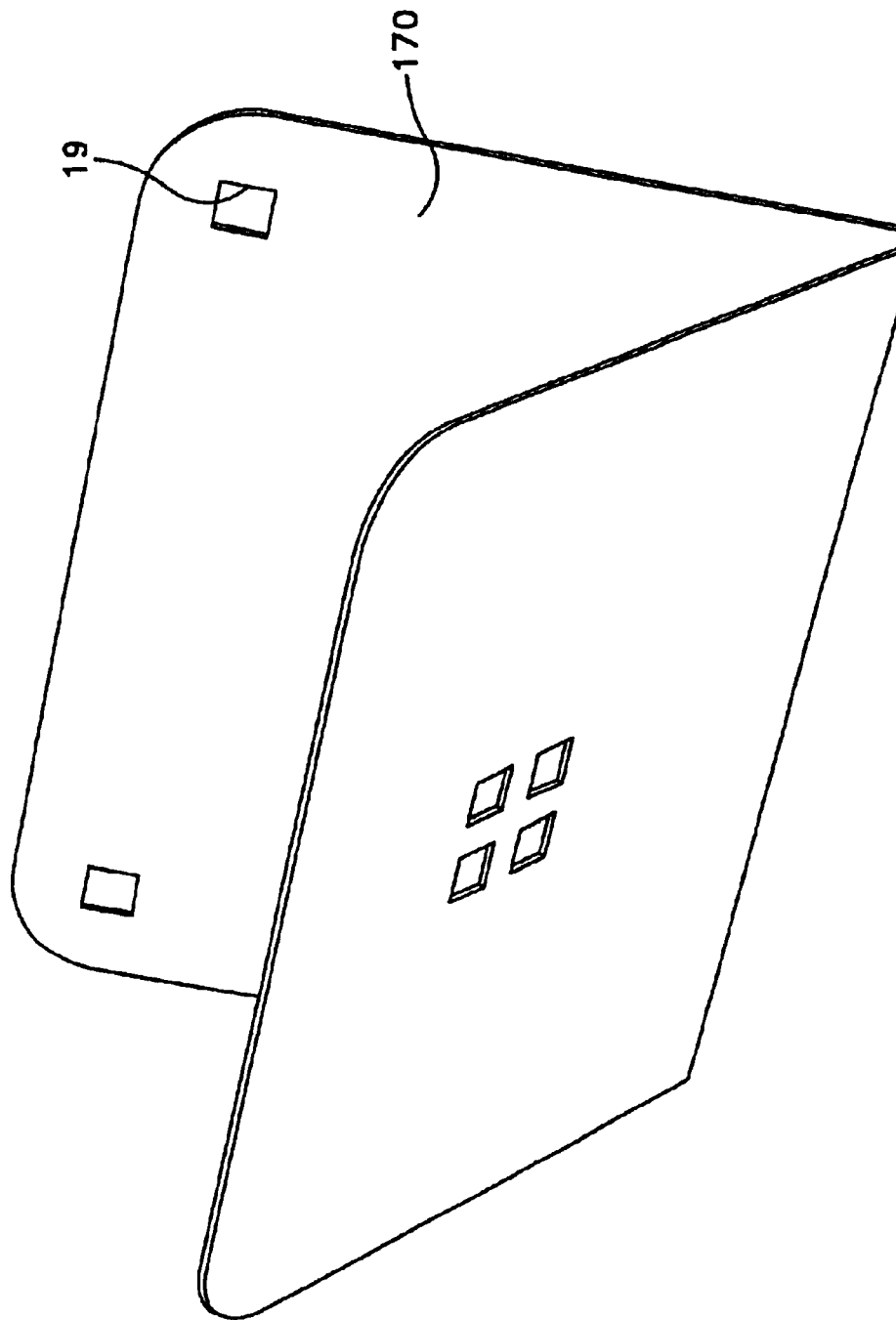
FIG. 31 is an angle shelf formed in accordance with the present invention.
Figure 32:
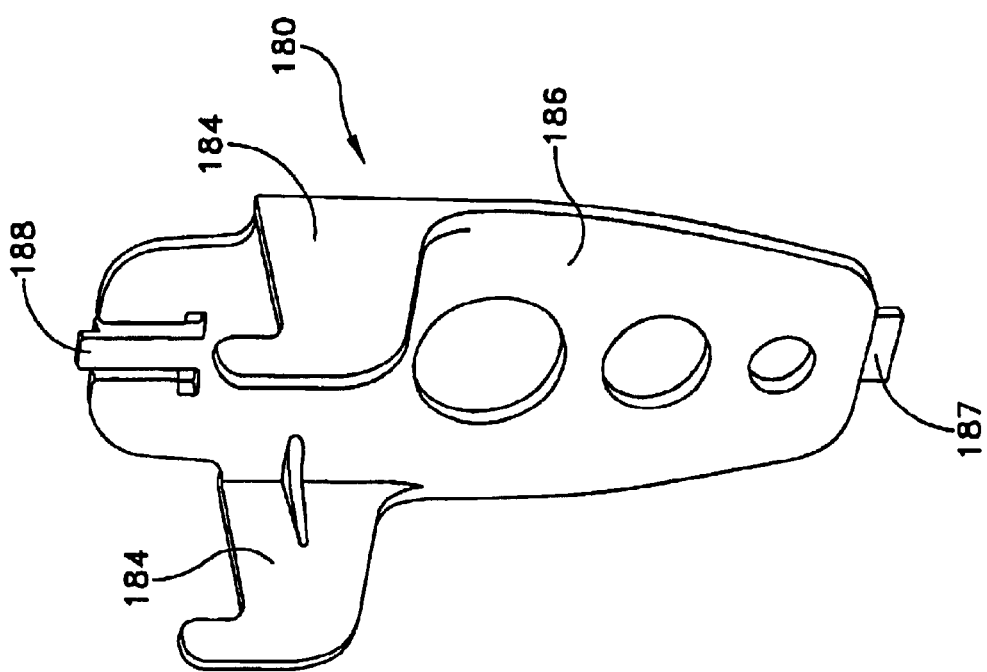

Referring to FIGS. 29 and 30, other item holders can be used in connection with storage system 5, such as dual hook support 180, or basket 182. More particularly, dual hook support 180 comprises a pair of hooks 184 that project outwardly from a back plate 186. A tab latch 187 projects downwardly from a bottom portion of back plate 186, and a latch cantilever 188 projects from a top of back plate 186. Dual hook 180 is assembled to perforated panel 8 by first inserting tab latch 187 into a perforation 9 of perforated panel 8. Back plate 186 is then pivoted about tab latch 187 until cantilever latch 188 is deflected into engagement with a corresponding perforation 9 in perforated panel 8.

Basket 182 is formed from a resilient polymer, and comprises a curved shell 183 having lower support tabs 190 projecting downwardly from a bottom surface and latch ears 192 projecting outwardly from the upper corner portions. To assemble basket 182 to perforated panel 8, latch ears 192 are deflected inwardly by pressing on the side walls of basket 182, while tabs 190 are inserted into respective holes 9. Basket 182 is then pivoted on tabs 190 until latch ears 192 are received within corresponding perforations 9. Once latch ears 192 are inserted within perforations 9, basket 182 is released, allowing latch ears 192 to spring outwardly into engagement with perforated panel 8.

It is to be understood that the present invention is by no means limited only to the particular constructions herein disclosed and shown in the drawings, but also comprises any modifications or equivalents within the scope of the claims.

What is claimed is:

1. A system for supporting an item on a vertically oriented structure comprising, in combination:
    a substantially planar board having a front surface, a rear surface, and a plurality of spaced perforations wherein each perforation is defined by at least an internal top edge and an internal bottom edge of said board; and
    an item holder comprising a shank having a support arm extending outwardly from a first end and a catch located at a second end wherein said catch comprises a curved cantilevered strap projecting from said second end and having a stop tab located at a strap end positioned above, but spaced away from said second end wherein a slot is defined through the underside of said cantilevered strap between a top portion of said shank and said strap end of said cantilevered strap so that when said curved cantilevered strap is located within one of said plurality of perforations, said stop tab is engaging said front surface and said slot engages said internal bottom edge of said board, wherein said stop tab includes inclined surfaces that form a nose at a front end and a shoulder surface at a rear end so as to form a wedge-shaped tab, further wherein said shoulder surface is wider than a width of said perforations such that when said cantilevered strap is inserted into one of said perforations, said shoulder surface engages said front surface so as to prevent said stop tab from passing through said perforation.

2. A system according to claim 1 wherein said first end of said cantilevered strap projects outwardly from said shoulder surface and a second end of said cantilevered strap projects outwardly from a top portion of said shank.

3. A system for supporting an item on a vertically oriented panel comprising, in combination:
    a panel having a front surface, a rear surface, and a plurality of spaced perforations wherein each perforation is defined by at least a peripheral top edge and a peripheral bottom edge of said panel; and
    an item holder comprising a shank having a support arm extending outwardly from a first end and a catch located at a second end wherein said catch comprises a curved cantilevered strap projecting from said second end including a radiused portion to effect said curve and having a stop tab located at a strap end positioned above, but spaced away from said second end wherein a slot is defined through the underside of said cantilevered strap between a top portion of said shank and said strap end of said cantilevered strap, wherein said catch engages said panel by said stop tab being deflected toward said second end and said radiused portion being positioned within a perforation so as to be disposed between said peripheral top edge and said peripheral bottom edge of said panel with said stop tab positioned adjacent to said front surface and said slot receiving said peripheral bottom edge of said panel, wherein said stop tab includes inclined surfaces that form a nose at a front end and a shoulder surface at a rear end so as to form a wedge-shaped tab so that said shoulder surface is wider than the width of said perforations such that when said cantilevered strap is inserted into one of said perforations, said shoulder surface engages said front surface.

4. A system according to claim 3 wherein said first end of said cantilevered strap projects outwardly from said shoulder surface and a second end of said cantilevered strap projects outwardly from a top portion of said shank.

5. A system for supporting an item on a perforated panel comprising, in combination:
    a panel having a front surface and a plurality of spaced perforations wherein each perforation is defined by a peripheral top edge, a peripheral bottom edge, and spaced-apart peripheral side edges of said panel; and an item holder comprising a shank having a support arm extending outwardly from a first end and a catch located at a second end, said catch comprising a curved, biasable cantilevered strap projecting from said second end and having a stop tab located at a strap end positioned above, but spaced away from said second end wherein a slot is defined through said cantilevered strap between said second end of said shank and said strap end, wherein when said catch engages said panel, said curved cantilevered strap is biased toward said strap end by said peripheral top edge with said stop tab being positioned on said front surface and a portion of said peripheral bottom edge of said panel being received within said slot, wherein said stop tab includes inclined surfaces that form a nose at a front end and a shoulder surface at a rear end so as to form a wedge-shaped tab so that said shoulder surface is wider than the width of said spaced-apart peripheral side edges such that when said cantilevered strap is inserted into one of said perforations, said shoulder surface engages said front surface.

6. A system according to claim 5 wherein said first end of said cantilevered strap projects outwardly from said shoulder surface and a second end of said cantilevered strap projects outwardly from a top portion of said shank.

* * * * *